(12) United States Patent
Holcomb et al.

(10) Patent No.: US 7,580,584 B2
(45) Date of Patent: Aug. 25, 2009

(54) ADAPTIVE MULTIPLE QUANTIZATION

(75) Inventors: Thomas W. Holcomb, Bothell, WA (US); Chih-Lung Lin, Redmond, WA (US); Pohsiang Hsu, Redmond, WA (US); Sridhar Srinivasan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 811 days.

(21) Appl. No.: 10/893,166

(22) Filed: Jul. 17, 2004

(65) Prior Publication Data

US 2005/0036699 A1    Feb. 17, 2005

Related U.S. Application Data

(63) Continuation-in-part of application No. 10/623,195, filed on Jul. 18, 2003.

(60) Provisional application No. 60/488,710, filed on Jul. 18, 2003.

(51) Int. Cl.
*G06K 9/36* (2006.01)
*G06K 9/46* (2006.01)

(52) U.S. Cl. .................. 382/239; 382/233; 382/251

(58) Field of Classification Search ............ 382/233, 382/239, 251; 375/240.03, 240.25
See application file for complete search history.

(56) References Cited

U.S. PATENT DOCUMENTS

| | | | |
|---|---|---|---|
| 4,583,114 A | 4/1986 | Catros | |
| 4,679,079 A | 7/1987 | Catros et al. | |
| 4,774,574 A | 9/1988 | Daly et al. | |
| 4,862,264 A | 8/1989 | Wells et al. | |
| 4,965,830 A | 10/1990 | Barham et al. | |
| 4,992,889 A | 2/1991 | Yamagami et al. | |
| 5,072,295 A | 12/1991 | Murakami et al. | |
| 5,128,758 A | 7/1992 | Azadegan et al. | |
| 5,136,377 A * | 8/1992 | Johnston et al. | 375/240.12 |
| 5,179,442 A | 1/1993 | Azadegan et al. | |
| 5,237,410 A | 8/1993 | Inoue | |
| 5,241,395 A | 8/1993 | Chen | |
| 5,253,058 A | 10/1993 | Gharavi | |
| 5,301,242 A | 4/1994 | Gonzales et al. | |
| 5,303,058 A | 4/1994 | Fukuda et al. | |
| 5,317,396 A | 5/1994 | Fujinami | |
| 5,317,672 A | 5/1994 | Crossman et al. | |
| 5,374,958 A | 12/1994 | Yanagihara | |

(Continued)

FOREIGN PATENT DOCUMENTS

CA    1327074    2/1994

(Continued)

OTHER PUBLICATIONS

U.S. Appl. No. 10/846,140, filed May 15, 2004, Sullivan.

(Continued)

*Primary Examiner*—Phuoc Tran
(74) *Attorney, Agent, or Firm*—Klarquist Sparkman, LLP

(57) ABSTRACT

With adaptive multiple quantization, a video or other digital media codec can adaptively select among multiple quantizers to apply to transform coefficients based on content or bit rate constraints, so as to improve quality through rate-distortion optimization. The switch in quantizers can be signaled at the sequence level or frame level of the bitstream syntax, or can be implicitly specified in the syntax.

15 Claims, 9 Drawing Sheets

U.S. PATENT DOCUMENTS

| | | |
|---|---|---|
| 5,452,104 A | 9/1995 | Lee |
| 5,461,421 A | 10/1995 | Moon |
| 5,481,553 A | 1/1996 | Suzuki et al. |
| 5,559,557 A | 9/1996 | Kato |
| 5,565,920 A | 10/1996 | Lee et al. |
| 5,587,708 A | 12/1996 | Chiu |
| 5,606,371 A | 2/1997 | Gunnewick et al. |
| 5,623,424 A | 4/1997 | Azadegan et al. |
| 5,631,644 A | 5/1997 | Katata et al. |
| 5,654,760 A | 8/1997 | Ohtsuki |
| 5,657,087 A | 8/1997 | Jeong et al. |
| 5,663,763 A | 9/1997 | Yagasaki et al. |
| 5,731,836 A | 3/1998 | Lee |
| 5,731,837 A | 3/1998 | Hurst |
| 5,739,861 A | 4/1998 | Music |
| 5,748,789 A | 5/1998 | Lee et al. |
| 5,751,358 A | 5/1998 | Suzuki et al. |
| 5,751,379 A | 5/1998 | Markandey et al. |
| 5,761,088 A | 6/1998 | Hulyalkar et al. |
| 5,764,803 A | 6/1998 | Jacquin et al. |
| 5,786,856 A | 7/1998 | Hall et al. |
| 5,802,213 A | 9/1998 | Gardos |
| 5,809,178 A | 9/1998 | Anderson et al. |
| 5,819,035 A | 10/1998 | Devaney et al. |
| 5,825,310 A | 10/1998 | Tsutsui |
| 5,835,145 A | 11/1998 | Ouyang et al. |
| 5,835,237 A | 11/1998 | Ebrahimi |
| 5,844,613 A | 12/1998 | Chaddha |
| 5,867,167 A | 2/1999 | Deering |
| 5,870,435 A | 2/1999 | Choi et al. |
| 5,883,672 A | 3/1999 | Suzuki et al. |
| 5,969,764 A | 10/1999 | Sun et al. |
| 5,970,173 A | 10/1999 | Lee et al. |
| 5,990,957 A | 11/1999 | Ryoo |
| 6,058,362 A | 5/2000 | Malvar |
| 6,072,831 A | 6/2000 | Chen |
| 6,084,636 A | 7/2000 | Fujiwara et al. |
| 6,088,392 A | 7/2000 | Rosenberg |
| 6,104,751 A | 8/2000 | Artieri |
| 6,118,817 A | 9/2000 | Wang |
| 6,125,140 A | 9/2000 | Wilkinson |
| 6,148,107 A | 11/2000 | Ducloux et al. |
| 6,148,109 A | 11/2000 | Boon et al. |
| 6,160,846 A | 12/2000 | Chiang et al. |
| 6,167,091 A | 12/2000 | Okada et al. |
| 6,182,034 B1 | 1/2001 | Malvar |
| 6,212,232 B1 | 4/2001 | Reed et al. |
| 6,223,162 B1 | 4/2001 | Chen et al. |
| 6,240,380 B1 | 5/2001 | Malvar |
| 6,243,497 B1 | 6/2001 | Chiang et al. |
| 6,249,614 B1 | 6/2001 | Bocharova et al. |
| 6,256,422 B1 | 7/2001 | Mitchell et al. |
| 6,256,423 B1 | 7/2001 | Krishnamurthy |
| 6,263,024 B1 | 7/2001 | Matsumoto |
| 6,275,614 B1 | 8/2001 | Krishnamurthy et al. |
| 6,278,735 B1 | 8/2001 | Mohsenian |
| 6,292,588 B1 | 9/2001 | Shen et al. |
| 6,347,116 B1 | 2/2002 | Haskell et al. |
| 6,356,709 B1 | 3/2002 | Abe et al. |
| 6,370,502 B1 | 4/2002 | Wu et al. |
| 6,393,155 B1 | 5/2002 | Bright et al. |
| 6,418,166 B1 | 7/2002 | Wu et al. |
| 6,438,167 B1 | 8/2002 | Shimizu et al. |
| 6,456,744 B1 | 9/2002 | Lafe |
| 6,473,534 B1 | 10/2002 | Merhav et al. |
| 6,490,319 B1 | 12/2002 | Yang |
| 6,493,385 B1 | 12/2002 | Sekiguchi et al. |
| 6,519,284 B1 | 2/2003 | Pesquet-Popescu et al. |
| 6,546,049 B1 | 4/2003 | Lee |
| 6,571,019 B1 | 5/2003 | Kim et al. |
| 6,593,925 B1 | 7/2003 | Hakura et al. |
| 6,647,152 B2 | 11/2003 | Willis et al. |
| 6,654,417 B1 | 11/2003 | Hui |
| 6,678,422 B1 | 1/2004 | Sharma et al. |
| 6,687,294 B2 | 2/2004 | Yan et al. |
| 6,704,718 B2 | 3/2004 | Burges et al. |
| 6,721,359 B1 | 4/2004 | Bist et al. |
| 6,728,317 B1 | 4/2004 | Demos |
| 6,738,423 B1 * | 5/2004 | Lainema et al. ........ 375/240.03 |
| 6,759,999 B1 | 7/2004 | Doyen |
| 6,765,962 B1 | 7/2004 | Lee et al. |
| 6,771,830 B2 | 8/2004 | Goldstein et al. |
| 6,785,331 B1 | 8/2004 | Jozawa et al. |
| 6,792,157 B1 | 9/2004 | Koshi et al. |
| 6,795,584 B2 | 9/2004 | Karczewicz et al. |
| 6,801,572 B2 | 10/2004 | Yamada et al. |
| 6,810,083 B2 | 10/2004 | Chen et al. |
| 6,831,947 B2 | 12/2004 | Corbera |
| 6,873,654 B1 | 3/2005 | Rackett |
| 6,876,703 B2 | 4/2005 | Ismaeil et al. |
| 6,882,753 B2 | 4/2005 | Chen et al. |
| 6,947,045 B1 | 9/2005 | Ostermann et al. |
| 6,970,479 B2 | 11/2005 | Abrahamsson et al. |
| 6,990,242 B2 | 1/2006 | Malvar |
| 7,020,204 B2 | 3/2006 | Auvray et al. |
| 7,027,507 B2 | 4/2006 | Wu |
| 7,035,473 B1 * | 4/2006 | Zeng et al. .................. 382/251 |
| 7,042,941 B1 | 5/2006 | Laksono et al. |
| 7,058,127 B2 | 6/2006 | Lu et al. |
| 7,099,389 B1 | 8/2006 | Yu et al. |
| 7,110,455 B2 | 9/2006 | Wu et al. |
| 2001/0048718 A1 | 12/2001 | Bruls et al. |
| 2002/0044602 A1 | 4/2002 | Ohki |
| 2002/0136308 A1 | 9/2002 | Le Maguet et al. |
| 2002/0154693 A1 | 10/2002 | Demos et al. |
| 2002/0186890 A1 | 12/2002 | Lee et al. |
| 2003/0021482 A1 | 1/2003 | Lan et al. |
| 2003/0113026 A1 | 6/2003 | Srinivasan et al. |
| 2003/0128754 A1 | 7/2003 | Akimoto et al. |
| 2003/0194010 A1 | 10/2003 | Srinivasan et al. |
| 2003/0215011 A1 | 11/2003 | Wang et al. |
| 2004/0022316 A1 | 2/2004 | Ueda et al. |
| 2004/0090397 A1 | 5/2004 | Doyen et al. |
| 2004/0264568 A1 | 12/2004 | Florencio |
| 2004/0264580 A1 | 12/2004 | Chiang Wei Yin et al. |
| 2005/0013365 A1 | 1/2005 | Mukerjee et al. |
| 2005/0013497 A1 | 1/2005 | Hsu et al. |
| 2005/0013498 A1 | 1/2005 | Srinivasan et al. |
| 2005/0013500 A1 | 1/2005 | Lee et al. |
| 2005/0015246 A1 | 1/2005 | Thumpudi et al. |
| 2005/0015259 A1 | 1/2005 | Thumpudi et al. |
| 2005/0036698 A1 | 2/2005 | Beom |
| 2005/0036699 A1 | 2/2005 | Holcomb et al. |
| 2005/0041738 A1 | 2/2005 | Lin et al. |
| 2005/0052294 A1 | 3/2005 | Liang et al. |
| 2005/0094731 A1 | 5/2005 | Xu et al. |
| 2005/0123274 A1 | 6/2005 | Crinon et al. |
| 2005/0135484 A1 | 6/2005 | Lee et al. |
| 2005/0147163 A1 | 7/2005 | Li et al. |
| 2005/0152451 A1 | 7/2005 | Byun |
| 2005/0180502 A1 | 8/2005 | Puri |
| 2005/0207492 A1 | 9/2005 | Pao |
| 2005/0232501 A1 | 10/2005 | Mukerjee |
| 2006/0013307 A1 | 1/2006 | Olivier et al. |
| 2006/0013309 A1 | 1/2006 | Ha et al. |
| 2006/0140267 A1 | 6/2006 | He et al. |
| 2007/0009039 A1 | 1/2007 | Ryu |
| 2007/0009042 A1 | 1/2007 | Craig et al. |

FOREIGN PATENT DOCUMENTS

| | | |
|---|---|---|
| EP | 0932306 | 7/1999 |
| GB | 897363 | 5/1962 |
| JP | 2003061090 | 2/2003 |

| | | |
|---|---|---|
| KR | 132895 | 10/1998 |
| WO | WO 97/21302 | 6/1997 |
| WO | WO 00/21207 | 4/2000 |
| WO | WO 02/07438 | 1/2002 |
| WO | WO 2004/100554 | 11/2004 |
| WO | WO 2004/100556 | 11/2004 |
| WO | WO 2005/065030 | 7/2005 |
| WO | WO 2006/075895 | 7/2006 |

OTHER PUBLICATIONS

Ahmed et al., "Discrete Cosine Transform," *IEEE Trans. On Computers*, vol. C-23, No. 1, pp. 90-93 (Dec. 1984).
Atzori et al., "Adaptive Anisotropic Filtering (AAF) for Real-Time Visual Enhancement of MPEG-Coded Video Sequences," *IEEE Transactions on Circuits and Systems for Video Technology*, vol. 12, No. 5, pp. 285-298 (May 2002).
Bist et al., "Adaptive Quantization for Low Bit Rate Video Coding," *Proc. 1998 Int'l Conf. on Image Processing (ICIP 98)*, pp. 925-928 (1998).
Chen Shoushun et al., "Adaptive-Quantization Digital Image Sensor for Low-Power Image Compression," in *IEEE Transactions on Circuits and Systems—I: Regular Papers*, vol. 54, No. 1, pp. 13-25 (Jan. 2007).
Chisu, "Techniques for Accelerating Intensity-Based Rigid Image Registration," Thesis dated Jan. 15, 2005.
Clarke, "Image and Video Compression: A Survey," *Wiley InterScience Journal Abstract*, 2 pp., http://www.3.interscience.wiley.com [Downloaded from the World Wide Web on Jan. 25, 2006].
Diplom-Ingenieur et al., "Variable Block-Size Transforms for Hybrid Video Coding," Dissertation (2004).
"DivX Multi Standard Video Encoder," 2 pp. (Downloaded from the World Wide Web on Jan. 24, 2006).
Farvardin et al., "Optimum quantizer performance for a class of non-Gaussian memoryless sources," *IEEE Trans. Inform. Theory*, vol. IT-30, No. 3, pp. 485-497 (May 1984).
"A Fast Precise Implementation of 8×8 Discrete Cosine Transform Using the Streaming SIMD Extensions and MMX™ Instructions," Version 1.0, 25 pp. (Apr. 1999).
Flierl et al., "A Video Codec Incorporating Block-Based Multi-Hypothesis Motion-Compensated Prediction," in *Proceedings of the SPIE Conference on Visual Communications and image Processing*, Perth, Australia, vol. 4067, pp. 238-249 (Jun. 2000).
Flierl et al., "Generalized B Pictures and the Draft H.264/AVC Video Compression Standard," in *IEEE Transactions on Circuits and Systems for Video Technology*, vol. 13, No. 7, pp. 587-597 (Jul. 2003).
Foos et al., "JPEG 2000 compression of medical imagery," *Proc. SPIE*, vol. 3980, pp. 85-96 (2000).
Garrigues et al., "Atom position coding in a matching pursuit based video coder," *Lecture Notes in Computer Science*, 4 pp. (2005).
Gish et al., "Asymptotically efficient quantizing," *IEEE Trans. Inform. Theory*, vol. IT-14, No. 5 (Sep. 1968).
Golston et al., "Video codecs tutorial: Trade-offs with H.264, VC-1 and other advanced codecs," *Video/Imaging Design Line*, Mar. 2006, 9 pages.
"H.264 & IPTV Over DSL—Enabling New Telco Revenue Opportunities," *White Paper*, Intel/Envivio, May 15, 2004, available at http://www.envivio.com/images/products/H264whitepaper.pdf.
Huang et al., "A Frame-Based MPEG Characteristics Extraction Tool and Its Application in Video Transcoding," *IEEE Transactions on Consumer Electronics*, vol. 48, No. 3, Aug. 2002, pp. 522-532.
"ISO/IEC 11172-2 Coding of moving pictures and associated audio for digital storage media at up to about 1.5 Mbit/s," MPEG (Moving Pictures Expert Group), International Organization for Standardization, MPEG1 Video, 122 pp. (1993).
"ISO/IEC 13818-2. Generic coding of moving pictures and associated audio information," MPEG (Moving Pictures Expert Group), International Organization for Standardization, MPEG2 Video (1994).
ISO/IEC, "Information Technology—Coding of Audio-Visual Objects: Visual, ISO/IEC 14496-2, Committee Draft," 330 pp. (1998).
ITU-T, "ITU-T Recommendation H.261: Video Codec for Audiovisual Services at p×64 kbits," 28 pp. (1993).
ITU-T, "ITU-T Recommendation H.262: Information Technology—Generic Coding of Moving Pictures and Associated Audio Information: Video," 218 pp. (1995).
ITU-T, "ITU-T Recommendation H.263: Video Coding for Low Bit Rate Communication," 167 pp. (1998).
Joint Video Team (JVT) of ISO/IEC MPEG & ITU-T VCEG, "Draft ITU-T Recommendation and Final Draft International Standard of Joint Video Specification (ITU-T Rec. H.264 ISO/IEC 14496-10 AVC," 253 pp. (May 2003).
Joshi et al., "Comparison of generalized Gaussian and Laplacian modeling in DCT image coding," *IEEE Signal Proc. Letters*, vol. SPL-2, No. 5, pp. 81-82 (May 1995).
Kim et al., "Still image coding based on vector quantization and fractal approximation," *IEEE Transactions on Image Processing*, vol. 5, No. 4, pp. 587-597 (1996).
Lam et al., "A mathematical analysis of the DCT coefficient distributions for images," *IEEE Trans. Image Proc.*, vol. IP-9, No. 10, pp. 1661-1666 (Oct. 2000).
Legall, "MPEG: A Video Compression Standard for Multimedia Application," *Communications of the ACM*, vol. 34, No. 4, pp. 47-58 (Apr. 1991).
Legall, "The MPEG Video Compression Algorithm," *Signal Processing: Image Communication 4*, vol. 4, No. 2, pp. 129-140 (Apr. 1992).
Legall et al., "Transmission of HDTV signals under 140 Mbit/s using a subband decomposition and Discrete Cosine Transform coding," in *Signal Processing of HDTV*, Elsevier, Amsterdam, pp. 287-293 (1988).
Limb, "A Picture-Coding Algorithm for the Merli Scan," *IEEE Transactions on Communications*, pp. 300-305 (Apr. 1973).
Lloyd, "Least squares quantization in PCM," *IEEE Trans. Inform. Theory*, vol. IT-28, No. 2, pp. 7-12 (Mar. 1982) (reprint of work originally presented in Jul. 1957).
Loomis, "Using the Advanced Settings of the Windows Media Video 9 Advanced Profile Codec," 14 pp. (Document dated Apr. 2006) [Downloaded from the World Wide Web on Jun. 22, 2007].
Lopresto et al., "Image Coding Based on Mixture Modeling of Wavelet Coefficients and a Fast Estimation-Quantization Framework," *Proc. IEEE Data Compression Conference*, (Snowbird, UT), pp. 221-230 (Mar. 1997).
Mallat, "A theory for multiresolution signal decomposition: the wavelet representation," *IEEE Trans. Pattern Anal. And Machine Intell.*, vol. PAMI-11, No. 7, pp. 674-692 (Jul. 1989).
Marshall, "The Discrete Cosine Transform," 4 pp. (document dated Oct. 4, 2001) [downloaded from the World Wide Web on Mar. 30, 2006].
Martinez-Fonte et al., "An Empirical Study on Corner Detection to Extract Buildings in Very High Resolution Satellite Images," *IEEE-ProRisc, Veldhoven, The Netherlands*, pp. 288-293 (Nov. 2004).
Masala et al., "Perceptually Optimized MPEG Compression of Synthetic Video Sequences," Proc. ICIP, pp. I-601-I-604, *IEEE* (2005).
Max, "Quantizing for minimum distortion," *IEEE Trans. Inform. Theory*, vol. IT-6, No. 1, pp. 7-12 (Mar. 1960).
Microsoft Corporation, "Microsoft Debuts New Windows Media Player 9 Series, Redefining Digital Media on the PC," 4 pp. (Sep. 4, 2002) [Downloaded from the World Wide Web on May 14, 2004].
Mitra et al., "Two-Stage Color Palettization for Error Diffusion," *Proceedings of SPIE*, pp. 207-217 (Jun. 2002).
Mook, "Next-Gen Windows Media Player Leaks to the Web," *BetaNews*, 17 pp. (Jul. 19, 2002) [Downloaded from the World Wide Web on Aug. 8, 2003].
Muller, "Distribution shape of two-dimensional DCT coefficients of natural images," *IEE Electronics Letters*, vol. 29, No. 22 (Oct. 1993).
Murakami et al., "Comparison between DPCM and Hadamard transform coding in the composite coding of the NTSC color TV signal," *IEEE Trans. On Commun.*, vol. COM-30, No. 3, pp. 469-479 (Mar. 1982).
Musmann et al., "Advances in Picture Coding," *Proceedings of the IEEE*, vol. 73, No. 4, pp. 523-548 (Apr. 1985).
Neff et al., "Modulus Quantization for Matching Pursuit Video Coding," *IEEE Transactions on Circuits and Systems for Video Technology*, vol. 10, No. 6, pp. 895-912 (Sep. 2000).

Nguyen et al., "Set Theoretic Compression with an Application to Image Coding," *IEEE Transactions on Image Processing*, vol. 7, No. 7, pp. 1051-1056 (Jul. 1998).

Nougaret et al., "Quick Tuning of a Reference Locomotion Gait," IEEE Proc. Computer Animation '95, *IEEE*, 8 pp. (1995).

Park et al., "A post processing method for reducing quantization effects in low bit-rate moving picture coding," *IEEE Trans. Circuits Syst.*, Video Technology, vol. 9, pp. 161-171 (Feb. 1999).

Puri et al., "Motion-Compensated Video Coding with Adaptive Perceptual Quantization," *IEEE Transactions on Circuits and Systems for Video Technology*, vol. 1, No. 4, pp. 351-361 (Dec. 1991).

Reininger et al., "Distribution of two-dimensional DCT coefficients for images," *IEEE Trans. On Commun.*, vol. COM-31, No. 6, pp. 835-839 (Jun. 1983).

Ribas Corbera et al., "Rate Control in DCT Video Coding for Low-Delay Communications," *IEEE Transactions on Circuits and Systems for Video Technology*, vol. 9, No. 1, pp. 172-185 (Feb. 1999).

Schuster et al., "A Theory for the Optimal Bit Allocation Between Displacement Vector Field and Displaced Frame Difference," *IEEE J. on Selected Areas in Comm.*, vol. 15, No. 9, pp. 1739-1751 (Dec. 1997).

Shanableh et al., "Heterogeneous Video Transcoding to Lower Spatio-Temporal Resolutions and Different Encoding Formats," *IEEE Transactions on Multimedia*, vol. 2, No. 2, Jun. 2000, pp. 101-110.

Shen et al., "Rate-Distortion Optimization for Fast Hierarchical B-Picture Transcoding," *IEEE*, 2006, pp. 5279-5282.

Sony Electronics Inc., "Sony Vizaro DVD Encoder System DVA-V700," 4 pp. (2001).

Sullivan, "Efficient scalar quantization of exponential and Laplacian random variables," *IEEE Trans. Inform. Theory*, vol. IT-42, No. 5, pp. 1365-1374 (Sep. 1996).

Sullivan et al., "Rate-Distortion Optimization for Video Compression," *IEEE Signal Processing Magazine*, pp. 74-90 (Nov. 1998).

Sullivan et al., "The H.264/AVC Advanced Video Coding Standard: Overview and Introduction to the Fidelity Range Extensions," 21 pp. (Aug. 2004).

TAO et al., "Adaptive Model-driven Bit Allocation for MPEG Video Coding," *IEEE Transactions on Circuits and Systems for Video Tech.*, vol. 10, No. 1, pp. 147-157 (Feb. 2000).

Tescher, "Transform image coding," *Advances in Electronics and Electron. Physics*, Suppl. 12, Academic Press, New York, pp. 113-115 (1979).

Tsang et al., "Fuzzy Based Rate Control for Real-Time MPEG Video," *IEEE Transactions on Fuzzy Systems*, pp. 504-516 (1998).

"Video Coding for Low Bitrate Communication," ITU-T Recommendation H.263 (1996).

WIEN, "Variable Block-Size Transforms for Hybrid Video Coding," Dissertation, 182 pp. (Feb. 2004).

Wu et al., "Context-based adaptive lossless codec," *IEEE Trans. Communications*, vol. 45, pp. 437-444 (1997).

Wu et al., "Joint Estimation of Forward and Backward Motion Vectors for Interpolative Prediction of Video," *IEEE Transactions on Image Processing*, vol. 3, No. 5, pp. 684-687 (Sep. 1994).

Yang et al., "Rate Control for Videophone Using Local Perceptual Cues," *IEEE Transactions on Circuits and Systems for Video Tech.*, vol. 15, No. 4, pp. 496-507 (Apr. 2005).

Yuen et al., "A survey of hybrid MC/DPCM/DCT video coding distortions," *Signal Processing*, vol. 70, pp. 247-278 (1998).

Zhang et al., "Adaptive Field/Frame Selection for High Compression Coding," *SPIE Conf. on Image and Video Communications and Processing*, Jan. 2003, 13 pages.

\* cited by examiner

Figure 1, Prior Art
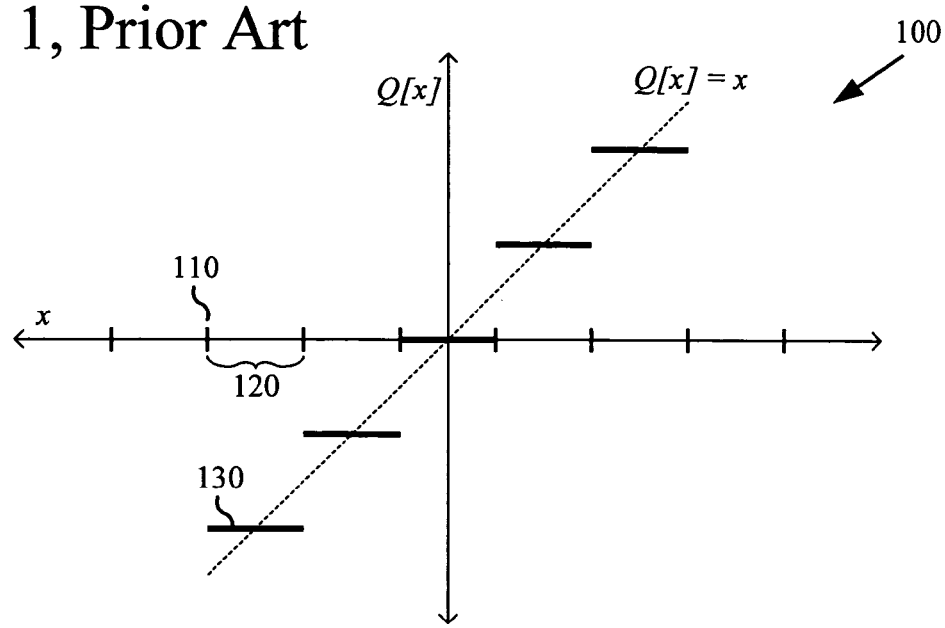
Figure 2a, Prior Art
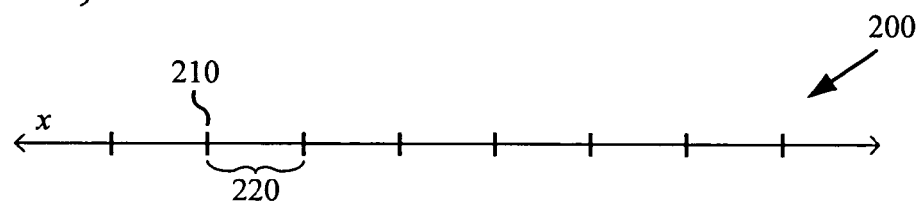
Figure 2b, Prior Art
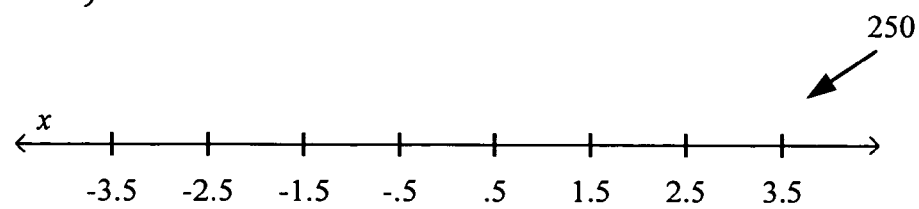

Figure 3, Prior Art
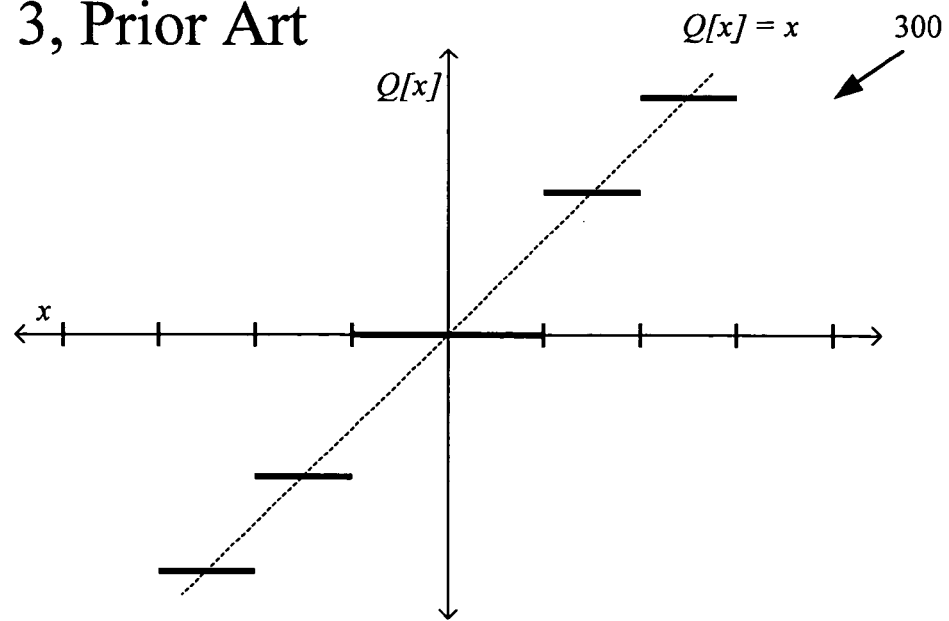
Figure 4a, Prior Art
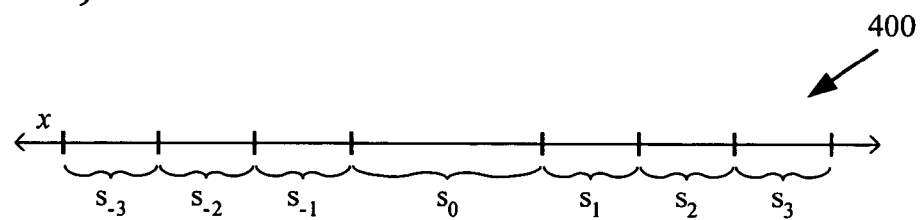
Figure 4b, Prior Art
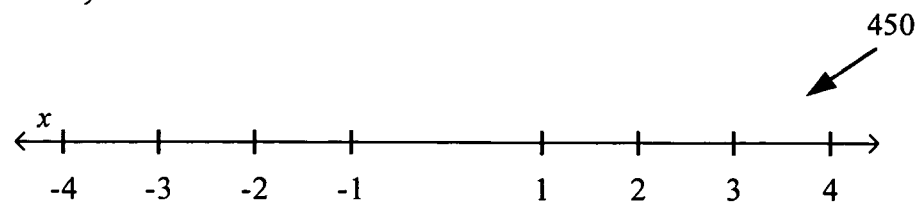

Figure 5, Prior Art
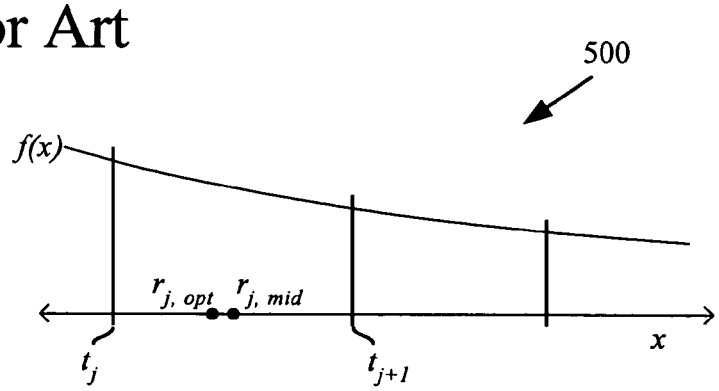
Figure 6, Prior Art
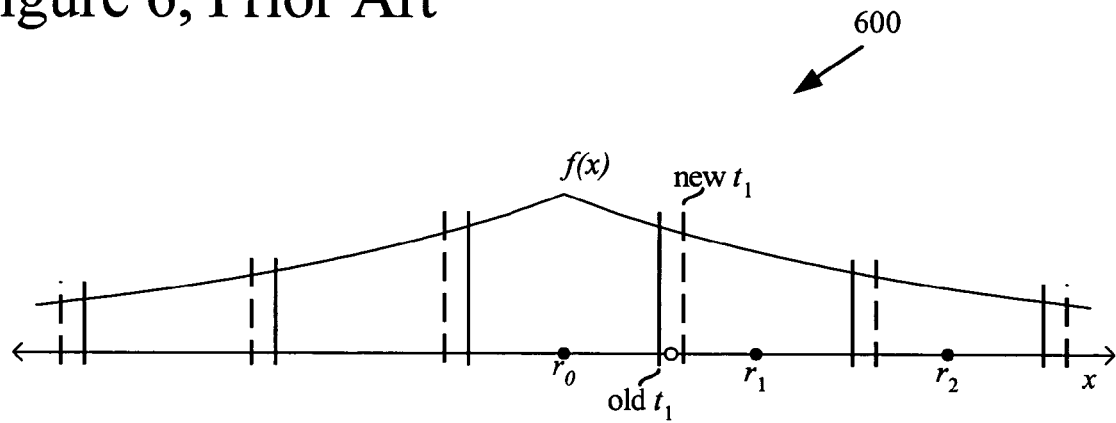

Software 780 implementing video encoder and/or decoder with adaptive multiple quantization and/or half quantization step size

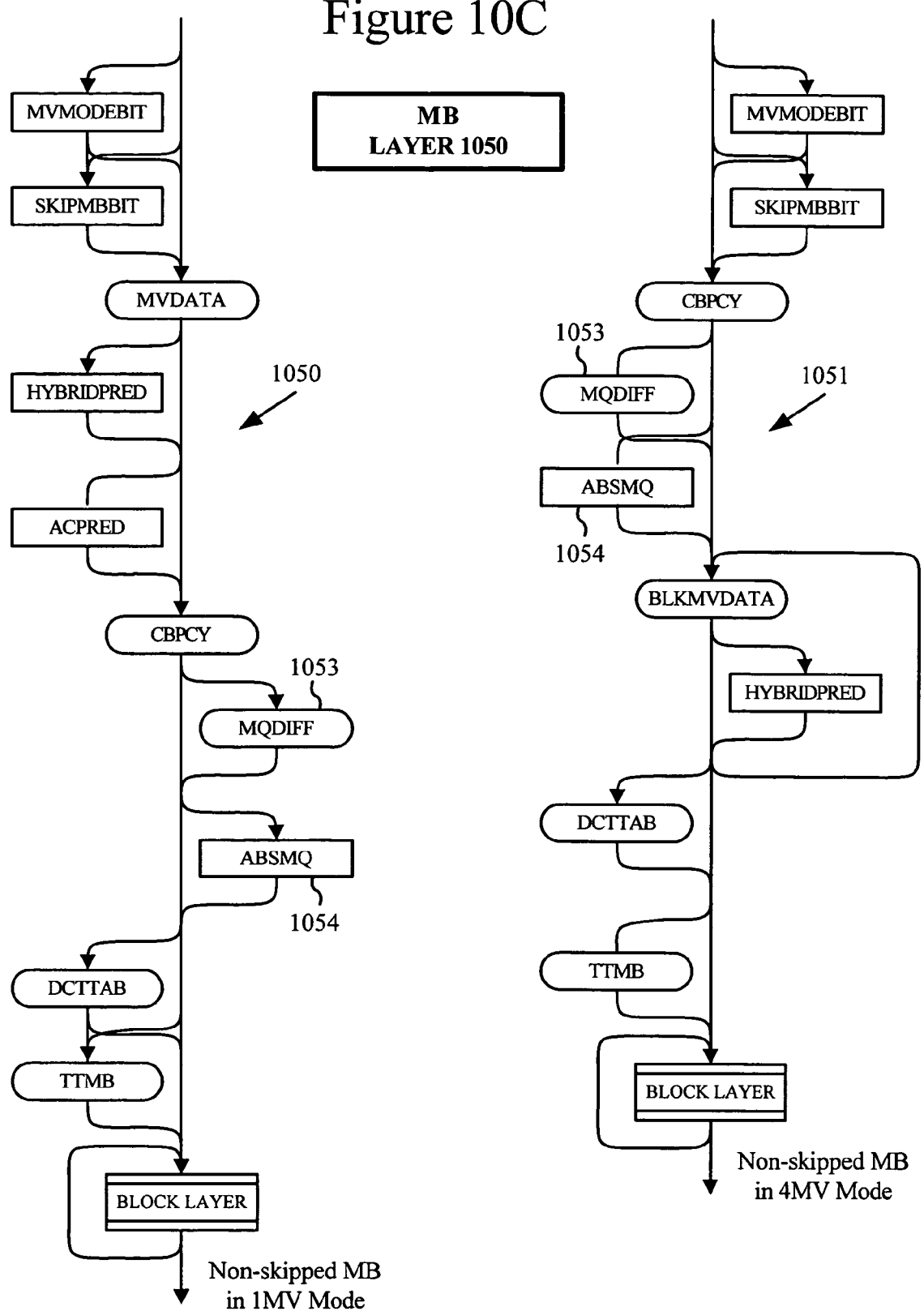

ADAPTIVE MULTIPLE QUANTIZATION

CROSS REFERENCE TO RELATED APPLICATIONS

This application claims the benefit of U.S. Provisional Patent Application Ser. No. 60/488,710, filed Jul. 18, 2003, the disclosure of which is incorporated herein by reference. This application also is a continuation-in-part of U.S. patent application Ser. No. 10/623,195, filed Jul. 18, 2003, the disclosure of which is incorporated herein by reference.

COPYRIGHT AUTHORIZATION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

TECHNICAL FIELD

The invention relates generally to video and other digital media coding and decoding, and more particularly relates to quantization of transform coefficients in video and other digital media coding and decoding.

BACKGROUND

With the increased popularity of DVDs, music delivery over the Internet, and digital cameras, digital media have become commonplace. Engineers use a variety of techniques to process digital audio, video, and images efficiently while still maintaining quality. To understand these techniques, it helps to understand how the audio, video, and image information is represented and processed in a computer.

I. Representation of Media Information in a Computer

A computer processes media information as a series of numbers representing that information. For example, a single number may represent the intensity of brightness or the intensity of a color component such as red, green or blue for each elementary small region of a picture, so that the digital representation of the picture consists of one or more arrays of such numbers. Each such number may be referred to as a sample. For a color image, it is conventional to use more than one sample to represent the color of each elemental region, and typically three samples are used. The set of these samples for an elemental region may be referred to as a pixel, where the word "pixel" is a contraction referring to the concept of a "picture element." For example, one pixel may consist of three samples that represent the intensity of red, green and blue light necessary to represent the elemental region. Such a pixel type is referred to as an RGB pixel. Several factors affect quality, including sample depth, resolution, and frame rate (for video).

Sample depth is a property normally measured in bits that indicates the range of numbers that can be used to represent a sample. When more values are possible for the sample, quality can be higher because the number can capture more subtle variations in intensity and/or a greater range of values. Images with higher resolution tend to look crisper than other images and contain more discernable useful details. Video with higher frame rate tends to mimic the smooth motion of natural objects better than other video, and can similarly be considered to contain more detail in the temporal dimension. For all of these factors, the tradeoff for high quality is the cost of storing and transmitting the information in terms of the bit rate necessary to represent the sample depth, resolution and frame rate, as Table 1 shows.

TABLE 1

Bit rates for different quality levels of raw video

| Bits Per Pixel (sample depth times samples per pixel) | Resolution (in pixels, Width × Height) | Frame Rate (in frames per second) | Bit Rate (in millions of bits per second) |
| --- | --- | --- | --- |
| 8 (value 0-255, monochrome) | 160 × 120 | 7.5 | 1.2 |
| 24 (value 0-255, RGB) | 320 × 240 | 15 | 27.6 |
| 24 (value 0-255, RGB) | 640 × 480 | 30 | 221.2 |
| 24 (value 0-255, RGB) | 1280 × 720 | 60 | 1327.1 |

Despite the high bit rate necessary for sending high quality video (such as HDTV), companies and consumers increasingly depend on computers to create, distribute, and play back high quality content. For this reason, engineers use compression (also called source coding or source encoding) to reduce the bit rate of digital media. Compression decreases the cost of storing and transmitting the information by converting the information into a lower bit rate form. Decompression (also called decoding) reconstructs a version of the original information from the compressed form. A "codec" is an encoder/decoder system. Two categories of compression are lossless compression and lossy compression.

Lossless compression reduces the bit rate of information by removing redundancy from the information without any reduction in fidelity. For example, a series of ten consecutive pixels that are all exactly the same shade of red could be represented as a code for the particular shade of red and the number ten as a "run length" of consecutive pixels, and this series can be perfectly reconstructed by decompression from the code for the shade of red and the indicated number (ten) of consecutive pixels having that shade of red. Lossless compression techniques reduce bit rate at no cost to quality, but can only reduce bit rate up to a certain point. Decreases in bit rate are limited by the inherent amount of variability in the statistical characterization of the input data, which is referred to as the source entropy. Entropy coding is another term for lossless compression.

In contrast, with lossy compression, the quality suffers somewhat but the achievable decrease in bit rate is more dramatic. For example, a series of ten pixels, each being a slightly different shade of red, can be approximated as ten pixels with exactly the same particular approximate red color. Lossy compression techniques can be used to reduce bit rate more than lossless compression techniques, but some of the reduction in bit rate is achieved by reducing quality, and the lost quality cannot be completely recovered. Lossy compression is often used in conjunction with lossless compression—in a system design in which the lossy compression establishes an approximation of the information and lossless compression techniques are applied to represent the approximation. For example, the series of ten pixels, each a slightly different shade of red, can be represented as a code for one particular shade of red and the number ten as a run-length of consecutive pixels. In decompression, the original series would then be reconstructed as ten pixels with the same approximated red color.

II. Quantization

According to one possible definition, quantization is a term used for an approximating non-reversible mapping function commonly used for lossy compression, in which there is a specified set of possible output values, and each member of the set of possible output values has an associated set of input values that result in the selection of that particular output value. A variety of quantization techniques have been developed, including scalar or vector, uniform or non-uniform, and adaptive or non-adaptive quantization.

A. Scalar Quantizers

According to one possible definition, a scalar quantizer is an approximating functional mapping x→Q[x] of an input value x to a quantized value Q[x]. FIG. 1 shows a "staircase" I/O function (100) for a scalar quantizer. The horizontal axis is a number line for a real number input variable x, and the vertical axis indicates the corresponding quantized values Q[x]. The number line is partitioned by thresholds such as the threshold (110). Each value of x within a given range between a pair of adjacent thresholds is assigned the same quantized value Q[x]. For example, each value of x within the range (120) is assigned the same quantized value (130). (At a threshold, one of the two possible quantized values is assigned to an input x, depending on the system.) Overall, the quantized values Q[x] exhibit a discontinuous, staircase pattern. The distance the mapping continues along the number line depends on the system, typically ending after a finite number of thresholds. The placement of the thresholds on the number line may be uniformly spaced (as shown in FIG. 1) or non-uniformly spaced.

A scalar quantizer can be decomposed into two distinct stages. The first stage is the classifier stage, in which a classifier function mapping x→A[x] maps an input x to a quantization index A[x], which is often integer-valued. In essence, the classifier segments an input number line or data set. FIG. 2a shows a generalized classifier (200) and thresholds for a scalar quantizer. As in FIG. 1, a number line for a real number variable x is segmented by thresholds such as the threshold (210). Each value of x within a given range such as the range (220) is assigned the same quantized value Q[x]. FIG. 2b shows a numerical example of a classifier (250) and thresholds for a scalar quantizer.

In the second stage, a reconstructor functional mapping k→β[k] maps each quantization index k to a reconstruction value β[k]. In essence, the reconstructor places steps having a particular height relative to the input number line segments (or selects a subset of data set values) for reconstruction of each region determined by the classifier. The reconstructor functional mapping may be implemented, for example, using a lookup table. Overall, the classifier relates to the reconstructor as follows:

$$Q[x]=\beta[A[x]] \quad (1).$$

The distortion introduced by using such a quantizer may be computed with a difference-based distortion measure d(x−Q[x]). Typically, such a distortion measure has the property that d(x−Q[x]) increases as x−Q[x] deviates from zero; and typically each reconstruction value lies within the range of the corresponding classification region, so that the straight line that would be formed by the functional equation Q[x]=x will pass through every step of the staircase diagram (as shown in FIG. 1) and therefore Q[Q[x]] will typically be equal to Q[x]. In general, a quantizer is considered better in rate-distortion terms if the quantizer results in a lower average value of distortion than other quantizers for a given bit rate of output. More formally, a quantizer is considered better if, for a source random variable X, the expected (i.e., the average or statistical mean) value of the distortion measure $\bar{D}=E_X\{d(X-Q[X])\}$ is lower for an equal or lower entropy H of A[X]. The most commonly-used distortion measure is the squared error distortion measure, for which $d(|x-y|)=|x-y|^2$. When the squared error distortion measure is used, the expected value of the distortion measure ($\bar{D}$) is referred to as the mean squared error.

B. Dead Zone+Uniform Threshold Quantizers

According to one possible definition, a dead zone plus uniform threshold quantizer ["DZ+UTQ"] is a quantizer with uniformly spaced threshold values for all classifier regions except the one containing the zero input value (which is called the dead zone ["DZ"]). A DZ+UTQ has a classifier index mapping rule x→A[x] that can be expressed based on two parameters. FIG. 3 shows a staircase I/O function (300) for a DZ+UTQ, and FIG. 4a shows a generalized classifier (400) and thresholds for a DZ+UTQ. The parameter s, which is greater than 0, indicates the step size for all steps other than the DZ. Mathematically, all $s_i$ are equal to s for i≠0. The parameter z, which is greater than or equal to 0, indicates the ratio of the DZ size to the size of the other steps. Mathematically, $s_0=z \cdot s$. In FIG. 4a, z is 2, so the DZ is twice as wide as the other classification zones. The index mapping rule x→A[x] for a DZ+UTQ can be expressed as:

$$A[x] = \text{sign}(x) * \max\left(0, \left\lfloor \frac{|x|}{s} - \frac{z}{2} + 1 \right\rfloor\right), \quad (2)$$

where $\lfloor \cdot \rfloor$ denotes the smallest integer less than or equal to the argument and where sign(x) is the function defined as:

$$\text{sign}(x) = \begin{cases} +1, & \text{for } x \geq 0, \\ -1, & \text{for } x < 0. \end{cases} \quad (3)$$

FIG. 4b shows a numerical example of a classifier (450) and thresholds for a DZ+UTQ with s=1 and z=2. FIGS. 1, 2a, and 2b show a special case DZ+UTQ with z=1. Quantizers of the UTQ form have good performance for a variety of statistical sources. In particular, the DZ+UTQ form is optimal for the statistical random variable source known as the Laplacian source.

In some system designs (not shown), an additional consideration may be necessary to fully characterize a DZ+UTQ classification rule. For practical reasons there may be a need to limit the range of values that can result from the classification function A[x] to some reasonable finite range. This limitation is referred to as clipping. For example, in some such systems the classification rule could more precisely be defined as:

$$A[x] = \text{sign}(x) * \min\left[g, \max\left(0, \left\lfloor \frac{|x|}{s} - \frac{z}{2} + 1 \right\rfloor\right)\right], \quad (4)$$

where g is a limit on the absolute value of A[x]. In much of the theoretical analysis presented herein, consideration of clipping is omitted as it unduly complicates the analysis without advancing the explanation. Moreover, although the clipping shown in the above example is symmetric about zero, the clipping does not need to be symmetric, and often is not exactly symmetric. For example, a common clipping range would be such that the value of A[x] is limited to some range from $-2^B$ to $+2^B-1$ so that A[x] can be represented as an integer using a two's complement representation that uses B+1 bits, where B+1 may be equal to 8 or 16 or another particular selected number of bits.

C. Reconstruction Rules

Different reconstruction rules may be used to determine the reconstruction value for each quantization index. These include the optimal reconstruction rule and the single offset reconstruction rule (of which the mid-point reconstruction rule is an example). FIG. 5 shows reconstruction points according to different reconstruction rules for a particular shape of a source probability distribution function f(x). For a range of values between two thresholds $t_j$ and $t_{j+1}$, the reconstruction value $r_{j,mid}$ according to the mid-point reconstruction rule bisects the range (thus, $r_{j,mid}=(t_j+t_{j+1})/2$). For the example probability distribution function shown in FIG. 5, this fails to account for the fact that values to the left of the mid-point are more likely than values to the right of the mid-point. The reconstruction value $r_{j,opt}$ according to the optimal reconstruction rule accounts for the probability distribution.

In general, a probability distribution function ["pdf"] indicates the probabilities for the different values of a variable. One possible definition of the optimal reconstruction value $r_{j,opt}$ for each region between two neighboring thresholds $t_j$ and $t_{j+1}$ for a pdf f(x) can be expressed as:

$$r_{j,opt} = \min_{y}{}^{-1} \int_{t_j}^{t_{j+1}} d(x-y)f(x)dx. \tag{5}$$

Assuming that the pdf f(x) for a given source is symmetric around zero, one possible definition of the optimal reconstruction rule of a DZ+UTQ for a symmetric, difference-based distortion measure $d(|x-y|)$ is:

$$\beta[k] = \begin{cases} \min_{y}{}^{-1} \int_{0}^{\frac{zs}{2}} [d(|x-y|)+d(|y-x|)]f(x)dx, & \text{for } k=0, \\ \text{sign}(k)\min_{y}{}^{-1} \int_{\frac{zs}{2}+(|k|-1)s}^{\frac{zs}{2}+|k|s} [d(|x-y|)f(x)dx, & \text{for } k \neq 0. \end{cases} \tag{6}$$

where $\gamma$ is the quantized value Q[x], and where the rule finds the quantized value Q[x] that results in the smallest distortion according to the distortion measure. Typically, the optimal quantized value for $\beta[0]$ is equal to 0, and that will be assumed to be true for the remainder of this description. For minimizing mean squared error, the optimal reconstruction rule sets the reconstruction value for each region equal to the conditional mean of the input values in that region. Stated more precisely, the optimal reconstruction value $r_{j,opt}$ for the region between two neighboring thresholds $t_j$ and $t_{j+1}$ for a pdf f(x) when using the mean squared error distortion measure is given by $$r_{j,opt} = \frac{\int_{t_j}^{t_{j+1}} x \cdot f(x)dx}{\int_{t_j}^{t_{j+1}} f(x)dx}. \tag{7}$$

According to one possible definition for a DZ+UTQ, the single-offset reconstruction rule is based on an offset parameter $\Delta$, where ordinarily $0<\Delta \leq s/2$, and the rule is:

$$\beta[k] = \begin{cases} 0, & \text{for } k=0, \\ \text{sign}(k)[(|k|+\frac{z}{2}-1)s+\Delta], & \text{for } k \neq 0. \end{cases} \tag{8}$$

The mid-point reconstruction rule is a special case of the single-offset reconstruction rule, specified by $\Delta=s/2$. Mid-point reconstruction is commonly used for convenience due to its simplicity. And, in the limit as s becomes very small, the performance of the mid-point rule becomes optimal under a variety of well-behaved mathematical conditions.

D. Specifying Reconstruction Values, Constructing Classifiers

Standards and product specifications that focus only on achieving interoperability will often specify reconstruction values without necessarily specifying the classification rule. In other words, some specifications may define the functional mapping $k \rightarrow \beta[k]$ without defining the functional mapping $x \rightarrow A[x]$. This allows a decoder built to comply with the standard/specification to reconstruct information correctly. In contrast, encoders are often given the freedom to change the classifier in any way that they wish, while still complying with the standard/specification.

Numerous systems for adjusting quantization thresholds have been developed. Many standards and products specify reconstruction values that correspond to a typical mid-point reconstruction rule (e.g., for a typical simple classification rule) for the sake of simplicity. For classification, however, the thresholds can in fact be adjusted so that certain input values will be mapped to more common (and hence, lower bit rate) indices, which makes the reconstruction values closer to optimal. FIG. 6 shows such adjusted thresholds for a classifier (600). The original thresholds (such as old $t_j$) are situated halfway between the reconstruction points. The thresholds are moved outward on the number line, away from 0. Before the adjustment, a marginal value (shown between the old $t_j$ and the new $t_j$) is mapped to $r_j$. After the adjustment, the marginal value is mapped to $r_0$. The decoder performs reconstruction without knowledge of the adjustments done in the encoder.

For optimal encoding, an encoder may adjust quantization thresholds to optimally fit a given set of reconstruction values as follows. The probability $p_j$ for the source random variable X to fall within a range j between $t_j$ and $t_{j+1}$ (where $t_{j+1}>t_j$) for a source pdf f(x) is:

$$p_j = \int_{t_j}^{t_{j+1}} f(x)dx, \tag{9}$$

and the number of bits necessary to represent an event with probability $p_j$ in an ideal lossless communication system may be quantified as:

$$h_j = \log_2 \frac{1}{p_j}, \tag{10}$$

where the $h_j$ is expressed in terms of bits. The total entropy of the classifier is then given by $$H = \sum_j p_j \cdot h_j \text{ bits.} \tag{11}$$

In general, if the encoder is required to use $b_j$ bits to indicate the selection of the reconstruction value $r_j$, the encoder may evaluate and optimize its thresholds according to minimization of the rate-distortion relation $D+\lambda R$, where D indicates distortion, R indicates bit usage, and $\lambda$ is a tuning parameter for favoring a particular selected balance between distortion and bit rate. For each particular threshold $t_{j+1}$ between two points $r_j$ and $r_{j+1}$, the encoder can set $t_{j+1}$ to the x that satisfies:

$$d(x-r_j)+\lambda b_j = d(x-r_{j+1})+\lambda b_{j+1} \tag{12}.$$

In an ideal design, $b_j$ will be approximately equal to $h_j$, and modern lossless coding techniques can be used to very nearly achieve this goal. In a design using some non-ideal lossless coding technique to represent the output of the classifier, $b_j$ may have some other value.

Note in summation that optimal decision thresholds can be selected using equation (12), that optimal reconstruction values can be selected using equation (5) or (7), and that optimal bit usage can be computed by setting $b_j$ equal to $h_j$ as given by equation (10) or to the number of bits used in some other lossless code (such as a Huffman code designed using equation (9) or a fixed-length code). In some highly-optimized scalar quantizer system designs, reconstruction values (initially uniformly spaced) are analyzed to adjust thresholds in encoder analysis, then use of the adjusted thresholds is analyzed to set the number of bits needed to represent the output of the classifier using lossless coding and to set the reconstruction values in decoder analysis. The new reconstruction values are then analyzed to adjust thresholds, and so on, until the thresholds and/or reconstruction values stabilize across iterations.

SUMMARY

Described tools and techniques relate to use of adaptive multiple quantization in video compression. With adaptive multiple quantization, more than one quantizer or quantization method is adaptively selected and applied during an encoding session. The codec can then select the quantizer deemed most suitable or appropriate based on the content and/or based on the bit rate constraints. For example, the codec may switch the quantizer at the sequence, frame or macroblock level.

In one implementation of adaptive multiple quantization, a video codec provides two quantizers of transform coefficients: uniform and non-uniform quantization. The non-uniform quantization is most likely suitable for low bit rate scenario, and also well suited for encoding of noisy content. On the other hand, the uniform quantization works better for high bit rate encoding sessions. The adaptive multiple quantization technique allows switching between the uniform and non-uniform quantization types as appropriate based on the content and/or bit rate constraints during encoding.

In one described implementation, a quantizer specifier syntax element is sent at the sequence level of the bit stream, and indicates the quantizer used for the sequence or that the quantizer is implicitly or explicitly signaled at the frame level of the bit stream. In this implementation, a picture quantizer index is sent at the frame level, and signals the quantizer scale index of the frame. If the quantizer specifier indicates the quantizer is implicitly signaled, the picture quantizer index also implicitly signals the quantizer (uniform or non-uniform). The mapping of picture quantizer index to quantizer scale is discontinuous with the implicit switch of quantizers to smooth the quality gap when switching quantizers.

Additional features and advantages will be made apparent from the following detailed description of various embodiments that proceeds with reference to the accompanying drawings.

BRIEF DESCRIPTION OF THE DRAWINGS

FIG. 1 is a chart showing a staircase I/O function for a scalar quantizer according to the prior art.

FIGS. 2a and 2b are charts showing classifiers and thresholds for scalar quantizers according to the prior art.

FIG. 3 is a chart showing a staircase I/O function for a DZ+UTQ according to the prior art.

FIGS. 4a and 4b are charts showing classifiers and thresholds for DZ+UTQs according to the prior art.

FIG. 5 is a chart showing reconstruction points for different reconstruction rules for a given pdf shape according to the prior art.

FIG. 6 is a chart showing adjustments to a classifier for a scalar quantizer according to the prior art.

FIGS. 10A-10C are diagrams for different syntax layers of a bitstream.

DETAILED DESCRIPTION

Described embodiments relate to techniques and tools for adaptive multiple quantization, for encoding and decoding bitstreams that include adaptive multiple quantization. In particular, signaling mechanisms for adaptive multiple quantization are described, including mechanisms for signaling which of multiple quantizers to use, either explicitly or implicitly. The various techniques and tools can be used in combination or independently.

I. Computing Environment

Figure 7:
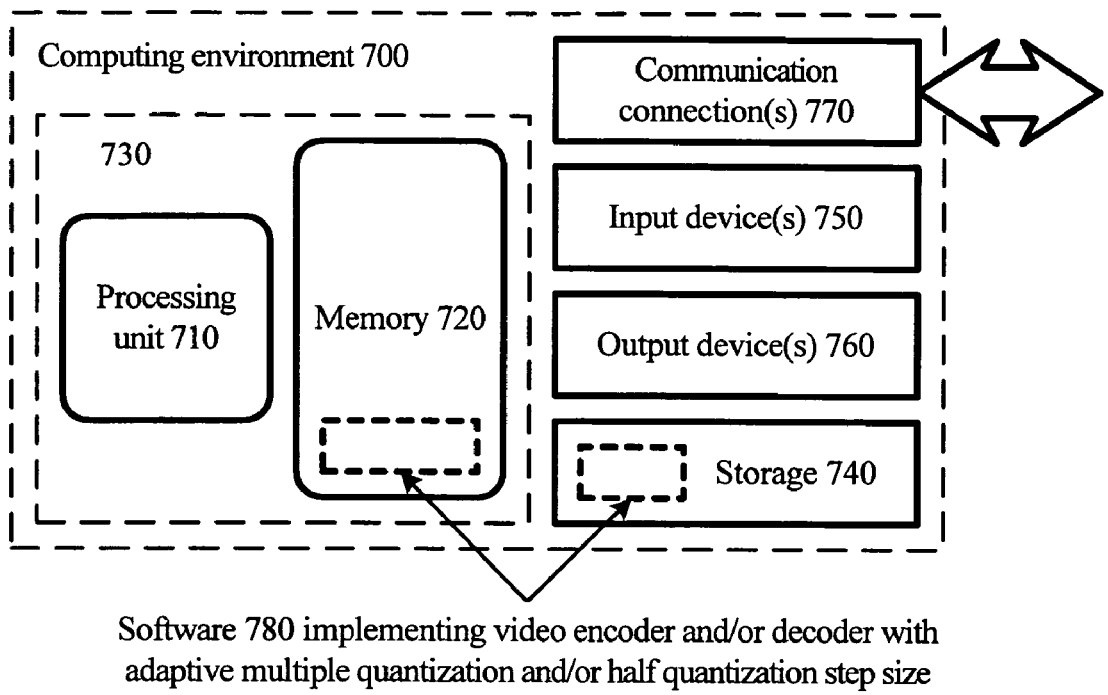
FIG. 7 is a block diagram of a suitable computing environment in which several described embodiments may be implemented.

FIG. 7 illustrates a generalized example of a suitable computing environment (700) in which several of the described embodiments may be implemented. The computing environment (700) is not intended to suggest any limitation as to scope of use or functionality, as the techniques and tools may be implemented in diverse general-purpose or special-purpose computing environments.

With reference to FIG. 7, the computing environment (700) includes at least one processing unit (710) and memory (720). In FIG. 7, this most basic configuration (730) is included within a dashed line. The processing unit (710) executes computer-executable instructions and may be a real or a virtual processor. In a multi-processing system, multiple processing units execute computer-executable instructions to increase processing power. The memory (720) may be volatile memory (e.g., registers, cache, RAM), non-volatile memory (e.g., ROM, EEPROM, flash memory, etc.), or some combination of the two. The memory (720) stores software (780) implementing an encoder and/or decoder with adaptive multiple quantization and/or half quantization step sizes.

A computing environment may have additional features. For example, the computing environment (700) includes storage (740), one or more input devices (750), one or more output devices (760), and one or more communication connections (770). An interconnection mechanism (not shown) such as a bus, controller, or network interconnects the components of the computing environment (700). Typically, operating system software (not shown) provides an operating environment for other software executing in the computing environment (700), and coordinates activities of the components of the computing environment (700).

The storage (740) may be removable or non-removable, and includes magnetic disks, magnetic tapes or cassettes, CD-ROMs, DVDs, or any other medium which can be used to store information and which can be accessed within the computing environment (700). The storage (740) stores instructions for the software (780) implementing the encoder and/or decoder.

The input device(s) (750) may be a touch input device such as a keyboard, mouse, pen, or trackball, a voice input device, a scanning device, or another device that provides input to the computing environment (700). For audio or video encoding, the input device(s) (750) may be a sound card, video card, TV tuner card, or similar device that accepts audio or video input in analog or digital form, or a CD-ROM or CD-RW that reads audio or video samples into the computing environment (700). The output device(s) (760) may be a display, printer, speaker, CD-writer, or another device that provides output from the computing environment (700).

The communication connection(s) (770) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (700), computer-readable media include memory (20), storage (740), and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

II. Video Encoder and Decoder

Figure 8:
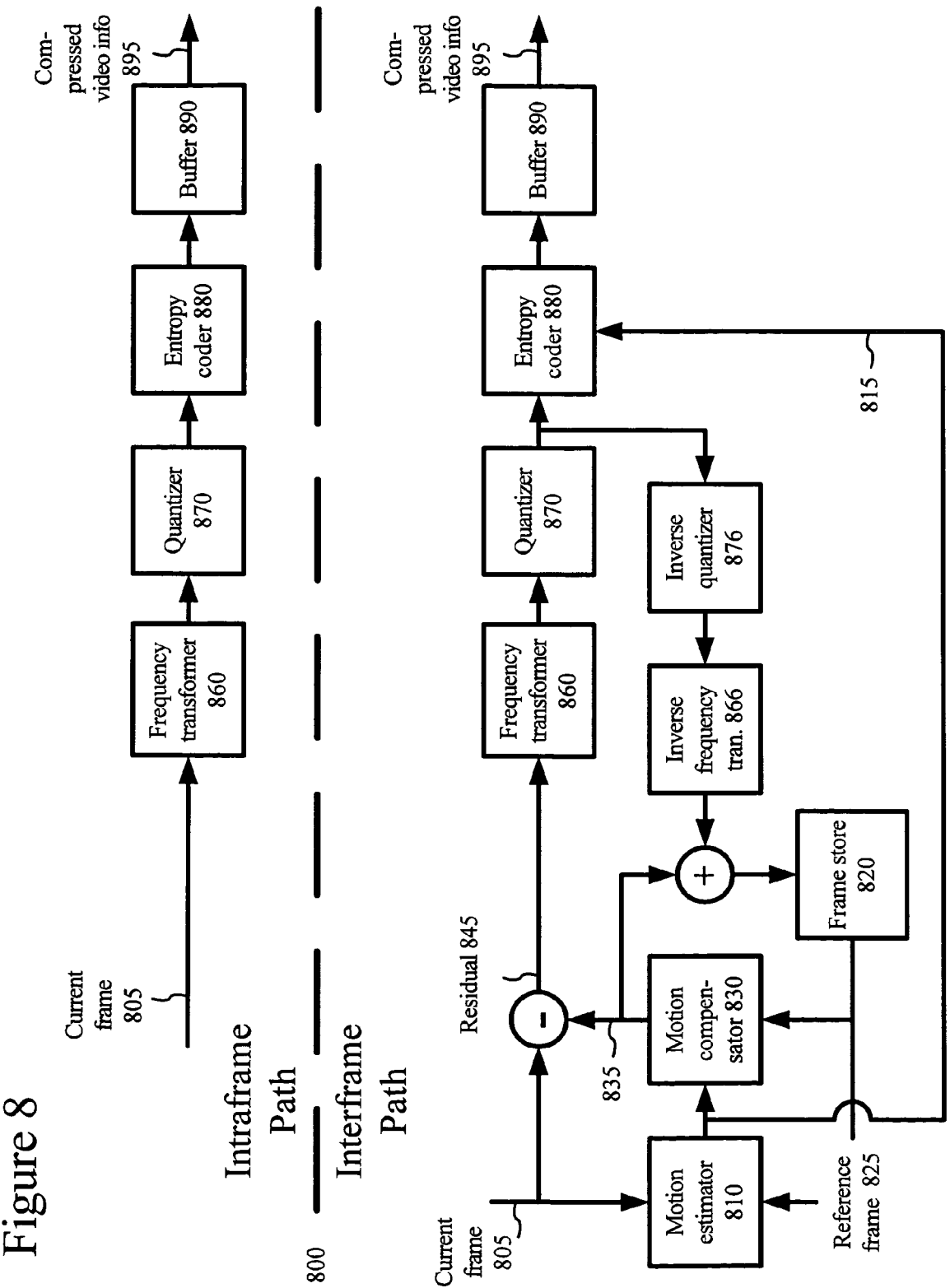
FIGS. 8 and 9 are block diagrams of a video encoder system and a video decoder system, respectively, in conjunction with which several described embodiments may be implemented.
Figure 9:
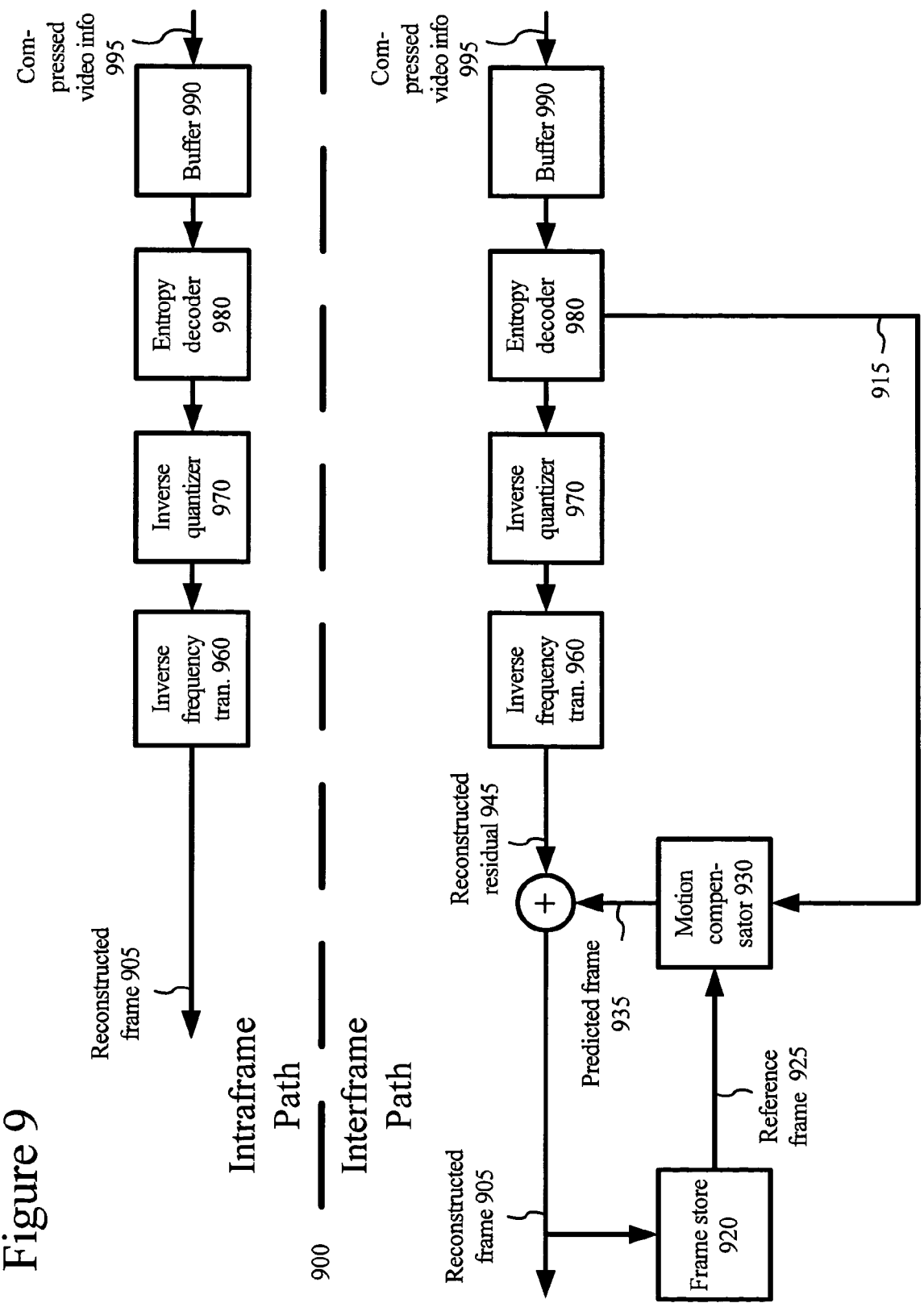

FIG. 8 is a block diagram of a generalized video encoder system (800), and FIG. 9 is a block diagram of a video decoder system (900), in conjunction with which various described embodiments may be implemented.

The relationships shown between modules within the encoder and decoder indicate the main flow of information in the encoder and decoder; other relationships are not shown for the sake of simplicity. In particular, FIGS. 8 and 9 usually do not show side information indicating the encoder settings, modes, tables, etc. used for a video sequence, frame, macroblock, block, etc. Such side information is sent in the output bitstream, typically after entropy encoding of the side information. The format of the output bitstream can be a Windows Media Video version 9 or other format.

The encoder (800) and decoder (900) are block-based and use a 4:2:0 macroblock format, with each macroblock including four 8×8 luminance blocks (at times treated as one 16×16 macroblock) and two 8×8 chrominance blocks. Alternatively, the encoder (800) and decoder (900) are object-based, use a different macroblock or block format, or perform operations on sets of pixels of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoders or decoders with different modules and/or other configurations of modules perform one or more of the described techniques.

A. Video Encoder

FIG. 8 is a block diagram of a general video encoder system (800) that can perform joint entropy coding and bitstream formation operations for variable-size transform information. The encoder system (800) receives a sequence of video frames including a current frame (805), and produces compressed video information (895) as output. Particular embodiments of video encoders typically use a variation or supplemented version of the generalized encoder (800).

The encoder system (800) compresses predicted frames and key frames. For the sake of presentation, FIG. 8 shows a path for key frames through the encoder system (800) and a path for forward-predicted frames. Many of the components of the encoder system (800) are used for compressing both key frames and predicted frames. The exact operations performed by those components can vary depending on the type of information being compressed.

A predicted frame (also called p-frame, b-frame for bi-directional prediction, or inter-coded frame) is represented in terms of prediction (or difference) from one or more other frames. A prediction residual is the difference between what was predicted and the original frame. In contrast, a key frame (also called an I-frame or intra-coded frame) is compressed without reference to other frames.

If the current frame (805) is a forward-predicted frame, a motion estimator (810) estimates motion of macroblocks or other sets of pixels of the current frame (805) with respect to a reference frame, which is a reconstructed previous frame (825) buffered in the frame store (820). In alternative embodiments, the reference frame is a later frame or the current frame is bi-directionally predicted. The motion estimator (810) can estimate motion by pixel, ½ pixel, ¼ pixel, or other increments, and can switch the precision of the motion estimation on a frame-by-frame basis or other basis. The precision of the motion estimation can be the same or different horizontally and vertically. The motion estimator (810) outputs as side information motion information (815) such as motion vectors. A motion compensator (830) applies the motion information (815) to the reconstructed previous frame (825) to form a motion-compensated current frame (835). The prediction is rarely perfect, however, and the difference between the motion-compensated current frame (835) and the original current frame (805) is the prediction residual (845). Alternatively, a motion estimator and motion compensator apply another type of motion estimation/compensation.

A frequency transformer (860) converts the spatial domain video information into frequency domain (i.e., spectral) data. For block-based video frames, the frequency transformer (860) applies a DCT or variant of DCT to blocks of the pixel data or prediction residual data, producing blocks of DCT coefficients. Alternatively, the frequency transformer (860) applies another conventional frequency transform such as a Fourier transform or uses wavelet or subband analysis. In embodiments in which the encoder uses spatial extrapolation (not shown in FIG. 8) to encode blocks of key frames, the frequency transformer (860) can apply a re-oriented frequency transform such as a skewed DCT to blocks of prediction residuals for the key frame. The frequency transformer (860) applies an 8×8, 8×4, 4×8, or other size frequency transforms (e.g., DCT) to prediction residuals for predicted frames.

A quantizer (870) then quantizes the blocks of spectral data coefficients. The quantizer applies uniform, scalar quantization to the spectral data with a step-size that varies on a frame-by-frame basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. For adaptive multiple quantization and/or half quantization step sizes, the encoder (800) operates and produces a bitstream in compliance with a syntax and semantics such as those described below. In addition to adaptive quantization, the encoder (800) can use frame dropping, adaptive filtering, or other techniques for rate control.

If a given macroblock in a predicted frame has no information of certain types (e.g., no motion information for the macroblock and no residual information), the encoder (800) may encode the macroblock as a skipped macroblock. If so, the encoder signals the skipped macroblock in the output bitstream of compressed video information (895).

When a reconstructed current frame is needed for subsequent motion estimation/compensation, an inverse quantizer (876) performs inverse quantization on the quantized spectral data coefficients. An inverse frequency transformer (866) then performs the inverse of the operations of the frequency transformer (860), producing a reconstructed prediction residual (for a predicted frame) or reconstructed samples (for an intra-coded frame). If the frame (805) being encoded is an intra-coded frame, then the reconstructed samples form the reconstructed current frame (not shown). If the frame (805) being encoded is a predicted frame, the reconstructed prediction residual is added to the motion-compensated predictions (835) to form the reconstructed current frame. The frame store (820) buffers the reconstructed current frame for use in predicting a next frame. In some embodiments, the encoder applies a deblocking filter to the reconstructed frame to adaptively smooth discontinuities between the blocks of the frame.

The entropy coder (880) compresses the output of the quantizer (870) as well as certain side information (e.g., motion information (815), spatial extrapolation modes, quantization step size). Typical entropy coding techniques include arithmetic coding, differential coding, Huffman coding, run length coding, LZ coding, dictionary coding, and combinations of the above. The entropy coder (880) typically uses different coding techniques for different kinds of information (e.g., DC coefficients, AC coefficients, different kinds of side information), and can choose from among multiple code tables within a particular coding technique.

The entropy coder (880) puts compressed video information (895) in the buffer (890). A buffer level indicator is fed back to bit rate adaptive modules. The compressed video information (895) is depleted from the buffer (890) at a constant or relatively constant bit rate and stored for subsequent streaming at that bit rate. Therefore, the level of the buffer (890) is primarily a function of the entropy of the filtered, quantized video information, which affects the efficiency of the entropy coding. Alternatively, the encoder system (800) streams compressed video information immediately following compression, and the level of the buffer (890) also depends on the rate at which information is depleted from the buffer (890) for transmission.

Before or after the buffer (890), the compressed video information (895) can be channel coded for transmission over the network. The channel coding can apply error detection and correction data to the compressed video information (895).

B. Video Decoder

FIG. 9 is a block diagram of a general video decoder system (900). The decoder system (900) receives information (995) for a compressed sequence of video frames and produces output including a reconstructed frame (905). Particular embodiments of video decoders typically use a variation or supplemented version of the generalized decoder (900).

The decoder system (900) decompresses predicted frames and key frames. For the sake of presentation, FIG. 9 shows a path for key frames through the decoder system (900) and a path for forward-predicted frames. Many of the components of the decoder system (900) are used for decompressing both key frames and predicted frames. The exact operations performed by those components can vary depending on the type of information being decompressed.

A buffer (990) receives the information (995) for the compressed video sequence and makes the received information available to the entropy decoder (980). The buffer (990) typically receives the information at a rate that is fairly constant over time, and includes a jitter buffer to smooth short-term variations in bandwidth or transmission. The buffer (990) can include a playback buffer and other buffers as well. Alternatively, the buffer (990) receives information at a varying rate. Before or after the buffer (990), the compressed video information can be channel decoded and processed for error detection and correction.

The entropy decoder (980) entropy decodes entropy-coded quantized data as well as entropy-coded side information (e.g., motion information (915), spatial extrapolation modes, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder (980) frequently uses different decoding techniques for different kinds of information (e.g., DC coefficients, AC coefficients, different kinds of side information), and can choose from among multiple code tables within a particular decoding technique.

If the frame (905) to be reconstructed is a forward-predicted frame, a motion compensator (930) applies motion information (915) to a reference frame (925) to form a prediction (935) of the frame (905) being reconstructed. For example, the motion compensator (930) uses a macroblock motion vector to find a macroblock in the reference frame (925). A frame buffer (920) stores previous reconstructed frames for use as reference frames. The motion compensator (930) can compensate for motion at pixel, ½ pixel, ¼ pixel, or other increments, and can switch the precision of the motion compensation on a frame-by-frame basis or other basis. The precision of the motion compensation can be the same or different horizontally and vertically. Alternatively, a motion compensator applies another type of motion compensation. The prediction by the motion compensator is rarely perfect, so the decoder (900) also reconstructs prediction residuals.

When the decoder needs a reconstructed frame for subsequent motion compensation, the frame store (920) buffers the reconstructed frame for use in predicting a next frame. In some embodiments, the encoder applies a deblocking filter to the reconstructed frame to adaptively smooth discontinuities between the blocks of the frame.

An inverse quantizer (970) inverse quantizes entropy-decoded data. In general, the inverse quantizer applies uniform, scalar inverse quantization to the entropy-decoded data with a step-size that varies on a frame-by-frame basis or other basis. Alternatively, the inverse quantizer applies another type of inverse quantization to the data, for example, a non-uniform, vector, or non-adaptive inverse quantization, or directly inverse quantizes spatial domain data in a decoder system that does not use inverse frequency transformations. For inverse quantization with adaptive multiple quantization and/or half quantization step sizes, the decoder (900) operates, for example, as described below.

An inverse frequency transformer (960) converts the quantized, frequency domain data into spatial domain video information. For block-based video frames, the inverse frequency transformer (960) applies an IDCT or variant of IDCT to blocks of the DCT coefficients, producing pixel data or prediction residual data for key frames or predicted frames, respectively. Alternatively, the frequency transformer (960) applies another conventional inverse frequency transform such as a Fourier transform or uses wavelet or subband synthesis. In embodiments in which the decoder uses spatial extrapolation (not shown in FIG. 9) to decode blocks of key frames, the inverse frequency transformer (960) can apply a re-oriented inverse frequency transform such as a skewed IDCT to blocks of prediction residuals for the key frame. The inverse frequency transformer (960) applies an 8×8, 8×4, 4×8, or other size inverse frequency transforms (e.g., IDCT) to prediction residuals for predicted frames.

III. Example Bitstream Syntax and Semantics

An example bitstream includes information for a sequence of compressed progressive video frames or other pictures. The bitstream is organized into several hierarchical layers that are decoded by a decoder such as the decoder (900) of FIG. 9. The highest layer is the sequence layer, which has information for the overall sequence of frames. Additionally, each compressed video frame is made up of data that is structured into three hierarchical layers. From top to bottom the layers are: picture, macroblock, and block.

Figure 10A:
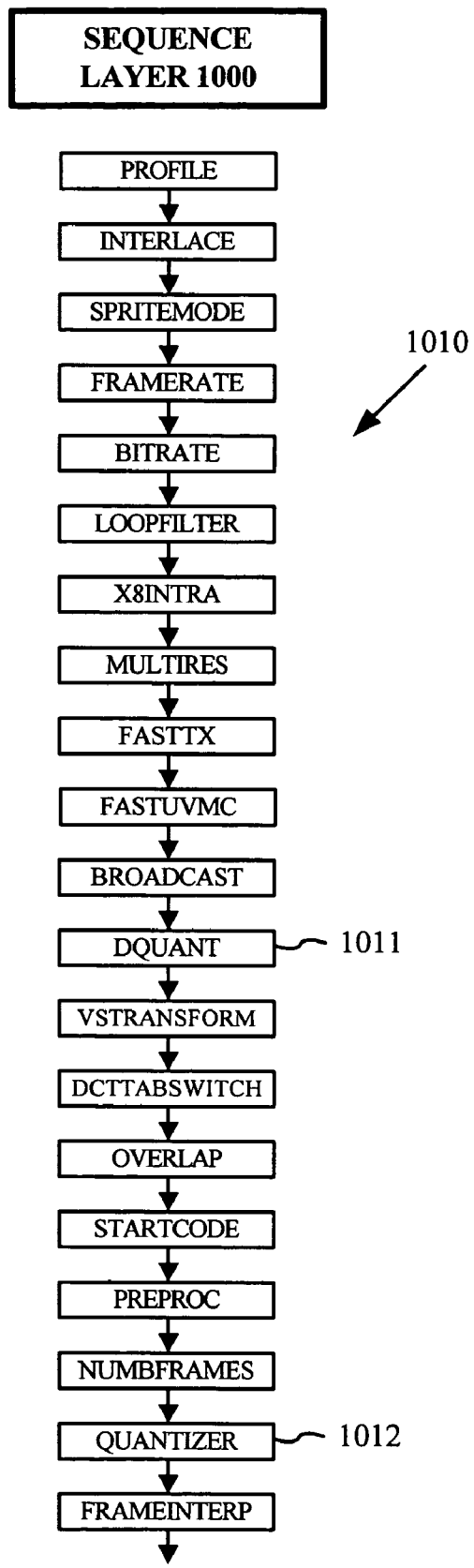
Figure 10B:
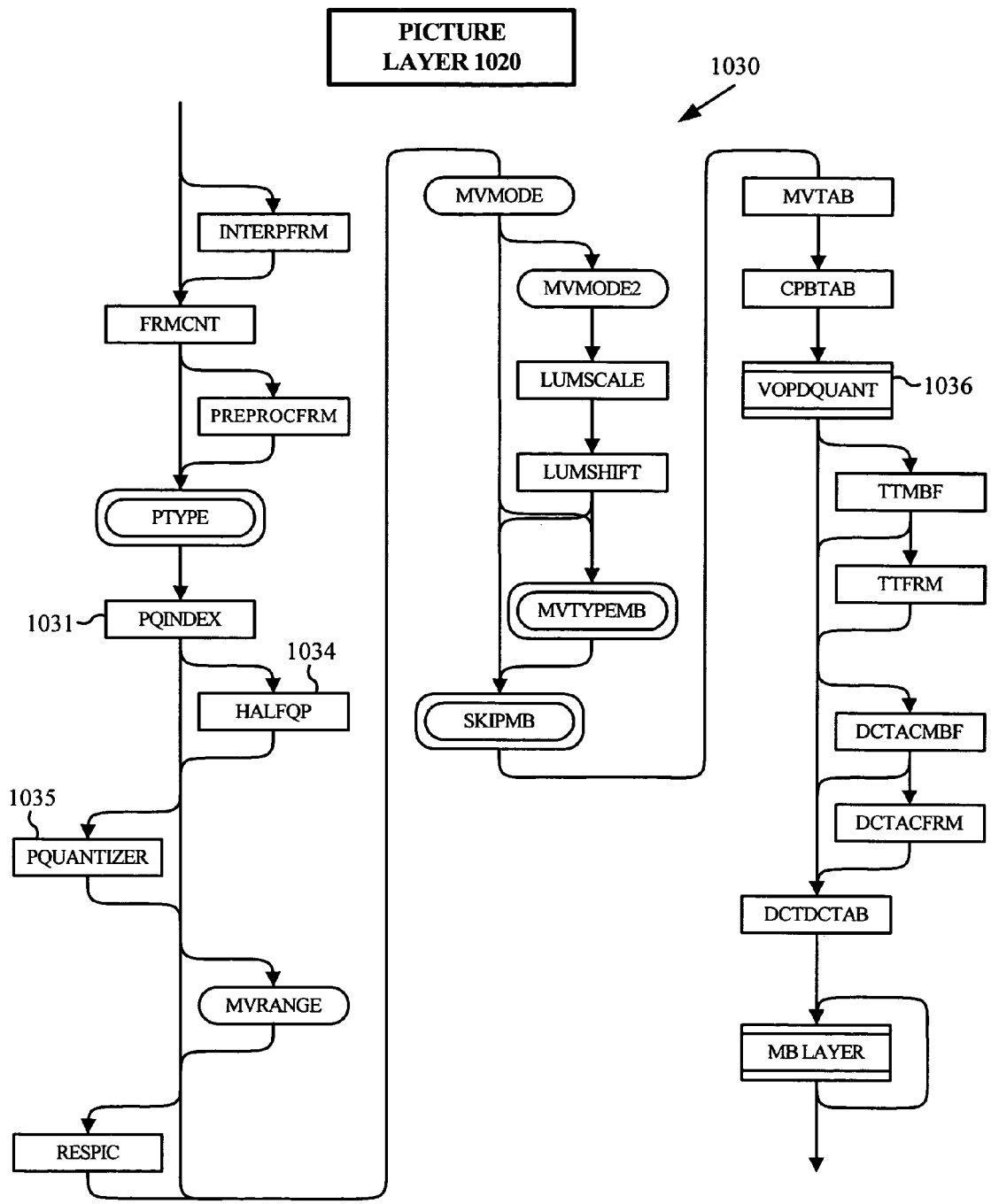

FIG. 10A is a syntax diagram for the sequence layer (1000), which includes a sequence header (1010) followed by data for the picture layer (see FIG. 10B). The sequence header (1010) includes several sequence-level elements that are processed by the decoder and used to decode the sequence, including a macroblock quantization (DQUANT) element (1011) and quantizer specifier (QUANTIZER) element (1012). DQUANT (1011) is a 2-bit field that indicates whether or not the quantization step size can vary within a frame. There are three possible values for DQUANT. If DQUANT=0, then the only one quantization step size (i.e. the frame quantization step size) can be used per frame. If DQUANT=1 or 2, then it is possible to quantize each of the macroblocks in the frame differently.

The QUANTIZER (1012) is a 2-bit fixed length code ["FLC"] field that indicates the quantizer used for the sequence. The quantizer types are encoded according to the following Table 2.

TABLE 2

Quantizer Specification

| FLC | Quantizer specification |
|-----|-------------------------|
| 00  | Quantizer implicitly specified at frame level |
| 01  | Quantizer explicitly specified at frame level |
| 10  | 5 QP deadzone quantizer used for all frames |
| 11  | 3 QP deadzone quantizer used for all frames |

FIG. 10B is a syntax diagram for the picture layer (1020) for a progressive forward-predicted frame ["progressive P-frame"]. Syntax diagrams for other pictures, such as interlaced P-pictures and progressive B-frames have many similar syntax elements. The picture layer (1020) includes a picture header (1030) followed by data for the microblock layer. The picture header (1030) includes several picture-level elements that are processed by the decoder and used to decode the corresponding frame. Some of those elements are only present if their presence is signaled or implied by a sequence-level element or a preceding picture-level element.

For example, the picture header (1030) includes a picture quantizer index (PQINDEX) element (1031). PQINDEX (1031) is a 5-bit field that signals the quantizer scale index for the entire frame. It is present in all picture types. If the implicit quantizer is used (signaled by sequence field QUANTIZER=00, see Table 2 above) then PQINDEX specifies both the picture quantizer scale (PQUANT) and the quantizer (3QP or 5QP deadzone) used for the frame. Table 3 shows how PQINDEX is translated to PQUANT and the quantizer for implicit mode.

TABLE 3

PQINDEX to PQUANT/Quantizer Deadzone Translation (Implicit Quantizer)

| PQINDEX | PQUANT | Quantizer Deadzone | PQINDEX | PQUANT | Quantizer Deadzone |
|---------|--------|--------------------|---------|--------|--------------------|
| 0  | NA | NA   | 16 | 13 | 5 QP |
| 1  | 1  | 3 QP | 17 | 14 | 5 QP |
| 2  | 2  | 3 QP | 18 | 15 | 5 QP |
| 3  | 3  | 3 QP | 19 | 16 | 5 QP |
| 4  | 4  | 3 QP | 20 | 17 | 5 QP |
| 5  | 5  | 3 QP | 21 | 18 | 5 QP |
| 6  | 6  | 3 QP | 22 | 19 | 5 QP |
| 7  | 7  | 3 QP | 23 | 20 | 5 QP |
| 8  | 8  | 3 QP | 24 | 21 | 5 QP |
| 9  | 6  | 5 QP | 25 | 22 | 5 QP |
| 10 | 7  | 5 QP | 26 | 23 | 5 QP |
| 11 | 8  | 5 QP | 27 | 24 | 5 QP |
| 12 | 9  | 5 QP | 28 | 25 | 5 QP |
| 13 | 10 | 5 QP | 29 | 27 | 5 QP |
| 14 | 11 | 5 QP | 30 | 29 | 5 QP |
| 15 | 12 | 5 QP | 31 | 31 | 5 QP |

If the quantizer is signaled explicitly at the sequence or frame level (signaled by sequence field QUANTIZER=01, 10 or 11, see Table 2 above) then PQINDEX is translated to the picture quantizer step size PQUANT as indicated by Table 4.

TABLE 4

PQINDEX to PQUANT Translation (Explicit Quantizer)

| PQ-INDEX | PQUANT 3QP Deadzone | PQUANT 5QP Deadzone | PQINDEX | PQUANT 3QP Deadzone | PQUANT 5QP Deadzone |
|----------|---------------------|---------------------|---------|---------------------|---------------------|
| 0  | NA | NA | 16 | 16 | 14 |
| 1  | 1  | 1  | 17 | 17 | 15 |
| 2  | 2  | 1  | 18 | 18 | 16 |
| 3  | 3  | 1  | 19 | 19 | 17 |
| 4  | 4  | 2  | 20 | 20 | 18 |
| 5  | 5  | 3  | 21 | 21 | 19 |
| 6  | 6  | 4  | 22 | 22 | 20 |
| 7  | 7  | 5  | 23 | 23 | 21 |
| 8  | 8  | 6  | 24 | 24 | 22 |
| 9  | 9  | 7  | 25 | 25 | 23 |
| 10 | 10 | 8  | 26 | 26 | 24 |
| 11 | 11 | 9  | 27 | 27 | 25 |
| 12 | 12 | 10 | 28 | 28 | 26 |
| 13 | 13 | 11 | 29 | 29 | 27 |
| 14 | 14 | 12 | 30 | 30 | 29 |
| 15 | 15 | 13 | 31 | 31 | 31 |

Alternatively, instead of the translation shown in Table 4, PQUANT is equal to PQINDEX for all values of PQINDEX from 1 through 31 when the quantizer is signaled explicitly at the sequence or frame level.

The picture header (1030) also includes a half QP step (HALFQP) element (1034) and picture quantizer type (PQUANTIZER) element (1035). HALFQP (1034) is a 1-bit field present if PQINDEX (1031) is less than or equal to 8. HALFQP (1034) allows the picture quantizer to be expressed in half step increments over the low PQUANT range. If HALFQP=1 then the picture quantizer step size is PQUANT+ ½. If HALFQP=0 then the picture quantizer step size is PQUANT. Therefore, if the 3QP deadzone quantizer is used then half step sizes are possible up to PQUANT=9 (i.e., PQUANT=1, 1.5, 2, 2.5 ... 8.5, 9) and then only integer step sizes are allowable above PQUANT=9. For the 5QP deadzone quantizer, half step sizes are possible up to PQUANT=7 (i.e., 1, 1.5, 2, 2.5 ... 6.5, 7).

PQUANTIZER (1035) is a 1-bit field present in all frame types if the sequence level field QUANTIZER=01 (see Table 2 above). In this case, the quantizer used for the frame is specified by PQUANTIZER. If PQUANTIZER=0 then the 5QP deadzone quantizer is used for the frame. If PQUANTIZER=1 then the 3QP deadzone quantizer is used.

The picture header (1030) further includes a macroblock quantization (VODPQUANT) field (1036). VODPQUANT (1036) may be used to adjust quantization step sizes for macroblocks (e.g., macroblocks at one or more edges of a frame, or on a per macroblock basis). For additional detail about VODPQUANT (1036), see U.S. patent application Ser. No. 10/623,195, filed Jul. 18, 2003.

FIG. 10C is a macroblock-layer (1050) bitstream syntax diagram for progressive P-frames. The bitstream syntax for the macroblock layer of I-pictures and B-pictures contain many elements in common. Data for a macroblock consists of a macroblock header that may be followed by block-layer data. More specifically, FIG. 10C illustrates two patterns of macroblock headers. The non-skipped 1MV macroblock header (1051) is a header for a macroblock that is not skipped and has one motion vector for the macroblock. The non-skipped 4MV macroblock header (1052) is a header for a macroblock that is not skipped and has up to four motion vectors, one for each of the four blocks of the macroblock. The headers for skipped 1MV macroblocks and skipped 4MV macroblocks are not shown.

The macro-block layer headers (1051, 1052) include a macroblock quantizer differential (MQDIFF) element (1053) and an absolute macroblock quantizer scale (ABSMQ) element (1054), which may be used to determine a macroblock quantization step size MQUANT when per-macroblock quantization step sizes are signaled for a progressive P-frame or other picture. For example, MQDIFF (1053) may be used to select between two alternative quantization step sizes for the macroblock, signal a differential quantization step size for the macroblock, or (with ABSMQ (1054)) signal an absolute quantization step size for the macroblock.

IV. Decoding and Dequantization of Transform Coefficients

For typical intra-coded blocks, a decoder such as the decoder (900) of FIG. 9 decodes coefficients, performs inverse quantization, and performs an inverse transform. For typical inter-coded blocks, a decoder such as the decoder (900) of FIG. 9 selects transform type(s), decodes subblock patterns, decodes coefficients, performs inverse quantization, and performs an inverse transform. The decoder obtains predicted blocks (or macroblocks) by motion compensation. To reconstruct the inter-coded blocks, the decoder combines the error and predicted blocks.

A. Inverse-Quantization for Baseline I-Frame Pictures

In each macroblock of a picture frame, the decoder decodes a DC coefficient and set of AC coefficients, which were each quantized at the encoder. These quantized transform coefficients are dequantized for a baseline I-Frame picture as described below.

1. DC Inverse-Quantization

The quantized DC coefficient (DCCoeffQ) is reconstructed by performing the following de-quantization operation:

DCCoefficient=DCCoeffQ*DCStepSize

The value of DCStepSize is based on the value of PQUANT (obtained in the picture header and described in Tables 3 and 4 above) as follows:

For PQUANT equal to 1 or 2:
DCStepSize=2*PQUANT

For PQUANT equal to 3 or 4:
DCStepSize=8

For PQUANT greater than or equal to 5:
DCStepSize=PQUANT/2+6

The DC inverse-quantization for macroblocks other than baseline I frame picture is basically the same, with the exception that each macroblock might have a different quantization step size specified by MQUANT.

2. Inverse AC Coefficient Quantization

Depending on whether the 3-QP or 5-QP deadzone quantizer is used (see Table 3 above), the non-zero quantized AC coefficients reconstructed as described in the sections above are inverse quantized according to the following formula:

*dequant_coeff=quant_coeff\*double_quant* (if 3-QP deadzone quantizer), or

*dequant_coeff=quant_coeff\*double_quant*+sign (*quant_coeff*)*quant_scale* (if 5-QP deadzone quantizer)

where:

quant_coeff is the quantized coefficient dequant_coeff is the inverse quantized coefficient double_quant=2*PQUANT+HalfStep quant_scale=PQUANT PQUANT is encoded in the picture layer as described in Tables 3 and 4 above. HalfStep is encoded in the picture layer as via the HALFQP element as described above.

B. Inverse-Quantization for Interlace I-Frame Pictures

The inverse quantization procedure is the same as for baseline I frame pictures described above with the exception that each macroblock might have a different quantization step size specified by MQUANT.

C. Inverse-Quantization for P Pictures

The quantized transform coefficients of P pictures are dequantized as described below.

1. Picture-Level Quantizer Scale

In decoding the picture layer, the decoder (900) decodes a picture-level quantizer scale. The frame level quantizer scale PQUANT is decoded from the 5-bit picture layer field PQINDEX as shown in Table 3 or 4. PQUANT specifies the frame level quantizer scale (a value between 1 and 31) for the macroblocks in the current picture. When the sequence header DQUANT=0, then PQUANT is used as the quantization step size for every macroblock in the current picture. When DQUANT !=0, then PQUANT is used as signaled by VOPDQUANT syntax field. The PQINDEX field also specifies whether the 3-QP or 5-QP deadzone quantizer is used for all macroblocks in the frame when implicit quantizer signaling is used.

2. Inverse Quantization

In decoding the block layer, the non-zero quantized coefficients are inverse quantized in one of two ways depending on the value of PQUANT and the quantizer used.

If the 3QP deadzone quantizer is used, the following formula describes the inverse quantization process:

dequant_coeff=quant_coeff*(2*quant_scale+half-step)

If the 5QP deadzone quantizer is used, the following formula describes the inverse quantization process:

dequant_coeff=quant_coeff*(2*quant_scale+half-step)+sign(quant_coeff)*quant_scale where:

quant_coeff is the quantized coefficient dequant_coeff is the inverse quantized coefficient quant_scale=The quantizer scale for the block (either PQUANT or MQUANT)

halfstep=The half step encoded in the picture layer as described above.

PQUANT is encoded in the picture layer as described above.

MQUANT is encoded in the macroblock layer as described above.

Having described and illustrated the principles of our invention, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method of coding/decoding video, comprising:

signaling a quantizer specifier mode for the video sequence, the quantizer specifier mode indicating if a deadzone-to-step size ratio of a quantizer is implicitly signaled from a value of a syntax element representing a quantizer scale or explicitly signaled at a frame level;

adaptively selecting among multiple quantizers based at least in part on bit rate constraints for coding a picture in a video sequence, wherein said adaptively selecting comprises a selection from quantizers having at least two different deadzone-to-step size ratios; and quantizing transform coefficients for blocks of the picture using the adaptively selected quantizer having the deadzone-to-step size ratio implicitly or explicitly signaled at frame level.

2. The method of claim 1 wherein said adaptively selecting among the multiple quantizers comprises a selection from a uniform quantizer and a non-uniform quantizer.

3. The method of claim 1 wherein the syntax element is a quantizer index, the quantizer index having a discontinuous relationship to the quantizer scale coincident with implicitly signaling a switch in deadzone-to-step size ratio of the adaptively selected quantizer for more smoothly representing quality.

4. The method of decoding a compressed video sequence using adaptive multiple quantization, the method comprising:

decoding a quantizer specifier element signaled for the compressed video sequence;

decoding syntax elements for individual pictures from the compressed video sequence indicating which of multiple quantizers to use on the respective individual pictures of the compressed video sequence based at least in part on the quantizer specifier element signaled for the compressed video sequence, wherein at least one choice of value of the quantizer specifier element indicates an adaptive choice of deadzone-to-step size ratio type of the quantizers to use on individual pictures is coded by the syntax elements for said individual pictures; and inverse quantizing quantized transform coefficients of the individual pictures using the respective quantizer indicated by the decoded syntax elements to use on the individual pictures.

5. The method of claim 4 wherein at least one choice of value of the quantizer specifier indicates only one deadzone-to-step size ratio type to use on all pictures of the compressed video sequence.

6. The method of claim 4 wherein at least one choice of value of the quantizer specifier indicates whether the deadzone-to-step size ratio of the quantizer to use on each individual picture is implicitly or explicitly signaled at a frame level of the bit stream syntax.

7. The method of claim 4 wherein at least one choice of value of the quantizer specifier indicates an adaptive choice of deadzone-to-step size ratio type of the quantizer is signaled at a frame level of the bit stream syntax, and another choice of value of the quantizer specifier indicates only one deadzone-to-step size ratio type to use on all pictures of the compressed video sequence.

8. The method of claim 6 wherein the syntax elements comprise a quantizer index element signaled at a frame level, the quantizer index element specifying a quantizer scale of a quantizer to use on an individual picture of the compressed video sequence, and in the case that the quantizer specifier has the value that indicates the deadzone-to-step size ratio is implicitly signaled at the frame level then the quantizer index element further implicitly representing which of multiple deadzone-to-step size ratio types of quantizers to use on the picture.

9. The method of claim 8 wherein the quantizer index element has a discontinuous relationship to the quantizer scale coincident with implicitly signaling a switch in deadzone-to-step size ratio types for more smoothly representing quality.

10. A computer-readable medium storing computer-executable instructions for causing a computer system programmed thereby to perform a method comprising:

decoding a quantizer specifier element signaled for a compressed video sequence;

decoding syntax elements for individual pictures from the compressed video sequence indicating which of multiple quantizers to use on the respective individual pictures of the compressed video sequence based at least in part on the quantizer specifier element signaled for compressed video sequence, wherein at least one choice of value of the quantizer specifier element indicates an adaptive choice of deadzone-to-step size ratio type of the quantizers to use on individual pictures is coded by the syntax elements for said individual pictures; and inverse quantizing quantized transform coefficients of the individual pictures using the respective quantizer indicated by the decoded syntax elements to use on the individual pictures.

11. The computer-readable medium of claim 10 wherein at least one choice of value of the quantizer specifier indicates only one deadzone-to-step size ratio type to use on all pictures of the compressed video sequence.

12. The computer-readable medium of claim 10 wherein at least one choice of value of the quantizer specifier indicates whether the deadzone-to-step size ratio of the quantizer to use on each individual picture is implicitly or explicitly signaled at a frame level of the bit stream syntax.

13. The computer-readable medium of claim 10 wherein at least one choice of value of the quantizer specifier indicates an adaptive choice of deadzone-to-step size ratio type of the quantizer is signaled at a frame level of the bit stream syntax, and another choice of value of the quantizer specifier indicates only one deadzone-to-step size ratio type to use on all pictures of the compressed video sequence.

14. The computer-readable medium of claim 12 wherein the syntax elements comprise a quantizer index element signaled at a frame level, the quantizer index element specifying a quantizer scale of a quantizer to use on an individual picture of the compressed video sequence, and in the case that the quantizer specifier has the value that indicates the deadzone-to-step size ratio is implicitly signaled at the frame level then the quantizer index element further implicitly representing which of multiple deadzone-to-step size ratio types of quantizers to use on the picture.

15. The computer-readable medium of claim 14 wherein the quantizer index element has a discontinuous relationship to the quantizer scale coincident with implicitly signaling a switch in deadzone-to-step size ratio types for more smoothly representing quality.

* * * * *

UNITED STATES PATENT AND TRADEMARK OFFICE
CERTIFICATE OF CORRECTION

PATENT NO.      : 7,580,584 B2            Page 1 of 1
APPLICATION NO. : 10/893166
DATED           : August 25, 2009
INVENTOR(S)     : Holcomb et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1226 days.

Signed and Sealed this

Fourteenth Day of September, 2010

David J. Kappos
*Director of the United States Patent and Trademark Office*